(12) United States Patent
Shinkai et al.

(10) Patent No.: US 8,118,469 B2
(45) Date of Patent: Feb. 21, 2012

(54) SURFACE ILLUMINATING DEVICE AND IMAGE DISPLAY APPARATUS

(75) Inventors: Shogo Shinkai, Miyagi (JP); Akihiro Shibata, Miyagi (JP); Katsuhiro Doi, Miyagi (JP); Satoko Asaoka, Miyagi (JP); Yasuyuki Kudo, Miyagi (JP)

(73) Assignee: Sony Corporation, Tokyo (JP)

( * ) Notice: Subject to any disclaimer, the term of this patent is extended or adjusted under 35 U.S.C. 154(b) by 218 days.

(21) Appl. No.: 12/545,645

(22) Filed: Aug. 21, 2009

(65) Prior Publication Data

US 2010/0046204 A1   Feb. 25, 2010

(30) Foreign Application Priority Data

Aug. 22, 2008   (JP) ................................. 2008-214600

(51) Int. Cl.
*F21V 7/04*   (2006.01)
(52) U.S. Cl. ........................................ 362/620; 362/97.3
(58) Field of Classification Search ........ 362/97.1–97.4, 362/615–622, 628, 610, 606
See application file for complete search history.

(56) References Cited

U.S. PATENT DOCUMENTS

| | | | |
|---|---|---|---|
| 7,063,448 B2 * | 6/2006 | Kang et al. | 362/558 |
| 7,789,538 B2 * | 9/2010 | Epstein et al. | 362/333 |
| 2006/0146571 A1 * | 7/2006 | Whitney | 362/615 |
| 2006/0239028 A1 * | 10/2006 | Yao et al. | 362/606 |
| 2006/0279953 A1 * | 12/2006 | Kim et al. | 362/332 |
| 2007/0035940 A1 * | 2/2007 | Yao et al. | 362/29 |
| 2007/0047258 A1 * | 3/2007 | Yao et al. | 362/615 |

FOREIGN PATENT DOCUMENTS

JP   2007-316421   12/2007

* cited by examiner

*Primary Examiner* — Julie Shallenberger
(74) *Attorney, Agent, or Firm* — K&L Gates LLP

(57) ABSTRACT

A surface illuminating device is provided and includes a plurality of linear light sources, a light-transmissive optical sheet including a luminance-distribution control layer for decreasing unevenness in luminance of light emitted from the linear light sources, and a reflection surface for reflecting the light emitted from the linear light sources. The luminance-distribution control layer includes a plurality of protrusions. In a range of $0 \leqq x \leqq L/2$, protruding directions of some or all the protrusions are inclined such that the protruding directions of the protrusions are located farther from a Z direction, which is an optical axis of a linear light source in an X direction, to the X direction as the protrusions are located farther from the position of x=0 in the X direction, where the X direction represents the arrangement direction of the linear light sources.

19 Claims, 20 Drawing Sheets

SURFACE ILLUMINATING DEVICE AND IMAGE DISPLAY APPARATUS

CROSS REFERENCES TO RELATED APPLICATIONS

The present application claims priority to Japanese Priority Patent Application JP 2008-214600 filed in the Japan Patent Office on Aug. 22, 2008, the entire content of which is hereby incorporated by reference.

BACKGROUND

An image display apparatus including a backlight device (surface illuminating device) is used as an image display apparatus for a word processor, a laptop personal computer, etc. In many cases, an edge light type backlight device is used as a surface illuminating device for such an image display apparatus to meet the demand on decreases in weight and thickness. In the edge light type backlight device, a linear light source, such as a fluorescent lamp, is arranged at a side of a transparent plate member (light guide plate), and a display panel is arranged on the light guide plate.

However, as an image display apparatus for television system etc. is recently increased in size, a luminance of an edge light type backlight device may be insufficient. Hence, a direct back light type backlight device (surface illuminating device), in which a linear light source is arranged directly below a display panel, is frequently used (for example, see Japanese Unexamined Patent Application Publication No. 2007-316421).

FIG. 22 is a perspective view showing a brief structure of a direct back light type backlight device 1 of related art. The backlight device 1 includes linear light sources 2 such as fluorescent lamps, a reflector plate 3, and a diffuser plate 4.

The linear light sources 2 may be, for example, cold cathode fluorescent lamps (CCFLs) or the like. The linear light sources 2 have columnar shapes extending in a predetermined direction.

The reflector plate 3 is arranged to reuse light which is reflected by the diffuser plate 4 and the like, and light which is emitted from the linear light sources 2 but does not reach the diffuser plate 4.

The diffuser plate 4 is an optical member, in which resin is randomly contained in a transparent base, the resin having a different refractive index from a refractive index of the transparent base. The diffuser plate 4 has a thickness of at least 1 mm to increase diffusing property and scattering property. The diffuser plate 4 decreases unevenness in front illuminance distribution.

In the backlight device 1, the reflector plate 3 and the diffuser plate 4 are arranged on opposite sides with the linear light sources 2 interposed therebetween.

The image display apparatus having the backlight device is recently increased in size and decreased in thickness. Owing to this, the backlight device is also increased in size and decreased in thickness. The number of linear light sources to be used for the backlight device is increased, and a gap between an optical sheet and the linear light sources is narrowed, the optical sheet being a flat plate arranged directly above the linear light sources.

Unfortunately, when the number of linear light sources to be used is increased, power consumption of the backlight device and the image display apparatus including the backlight device may be increased. Thus, the increase in power consumption may be suppressed by increasing a distance between the adjacent linear light sources, without increasing the number of linear light sources to be used.

If a distance L between the centers of the adjacent linear light sources 2 is increased, referring to FIG. 23, a luminance of irradiation light beams of the backlight device 1 may be increased at positions directly above the linear light sources 2, and decreased at positions between the linear light sources 2. Uniformity of a front luminance distribution is degraded, and the luminance may become uneven.

Even when a distance W between the center of each linear light source 2 and the diffuser plate 4 is decreased to decrease the thickness, regarding the front luminance distribution, the luminance may be increased at the positions directly above the linear light sources 2 and decreased at the positions between the linear light sources 2. Uniformity of a front luminance distribution is degraded, and the luminance may become uneven.

Hence, referring to FIG. 24, there is suggested a method of decreasing the unevenness in luminance by providing a plurality of protrusions 6, having the same aspherical shape, on a light exit surface 5a of a diffuser plate 5, which is formed by dispersing a diffusing material such as a filler in the diffuser plate 5. The method can provide a diffusing effect due to the filler and a diffusing effect due to the aspherical protrusions 6 for light directly above the linear light sources 2. The unevenness in luminance can be decreased.

However, with this method, if the distance L between the centers of the adjacent linear light sources 2 is increased or the distance W between the center of each linear light source 2 and the diffuser plate 5 is decreased, the effect of decreasing the unevenness in luminance may be degraded (see FIG. 24). It is difficult to increase the size and decrease the thickness of the image display apparatus while suppressing the increase in power consumption.

Alternatively, there is a method of increasing an amount of return light at positions directly above the linear light sources 2 by using a diffuser plate 8 having protrusions 7 each having a substantially prism shape, instead of the diffuser plate 5 having the aspherical protrusions 6.

However, with the diffuser plate 8, if the distance L between the centers of the adjacent linear light sources 2 is increased and the distance W between the center of each linear light source 2 and the diffuser plate 8 is decreased, referring to FIG. 25, unevenness in brightness every ½ period may appear such that a narrow area directly above the linear light source 2 is dark, an area next to the narrow area is bright, and a substantially middle area between the linear light sources 2 is dark.

In light of the situation, it is desirable to provide a surface illuminating device and an image display apparatus capable of decreasing unevenness in luminance without increasing power consumption.

SUMMARY

The present disclosure relates to a surface illuminating device and an image display apparatus, and more particularly to decreasing unevenness in luminance without increasing power consumption, by arranging a protruding direction of a protrusion in a part of an optical sheet in a predetermined direction.

A surface illuminating device according to an embodiment includes a plurality of linear light sources arranged in parallel to each other in a plane; a light-transmissive optical sheet including a luminance-distribution control layer formed on a light exit surface of the optical sheet, the luminance-distribution control layer decreasing unevenness in luminance of light emitted from the linear light sources; and a reflection surface positioned opposite to the optical sheet with the linear light sources interposed therebetween, the reflection surface reflecting the light emitted from the linear light sources. The luminance-distribution control layer of the optical sheet includes a plurality of protrusions, the protrusions having ridgelines extending substantially in parallel to an extending direction of the linear light sources and being arranged continuously in an arrangement direction of the linear light sources. In a range of $0 \leq x \leq L/2$, protruding directions of some or all the protrusions are inclined such that the protruding directions of the protrusions are located farther from a Z direction, which is an optical axis of a linear light source located at a position of x=0 in an X direction, to the X direction as the protrusions are located farther from the position of x=0 in the X direction, where the X direction represents the arrangement direction of the linear light sources, a Y direction represents the extending direction of the linear light sources, the Z direction represents a direction orthogonal to the X and Y directions, an inter-light-source distance L represents a distance between the centers of adjacent linear light sources from among the linear light sources, and a moving distance x represents a distance when light emitted from one of the adjacent linear light sources is directed toward the other of the adjacent linear light sources.

Accordingly, in the range of $0 \leq x \leq L/2$, the amount of light to be transmitted through the optical sheet is gradually increased as the protrusions are located farther from the position of x=0 in the X direction. Also, the luminance distribution of the light is substantially equalized without decreasing the inter-light-source distance L. Thus, the unevenness in luminance can be decreased without increasing the power consumption.

In the surface illuminating device, an angle θ may be determined as $\theta1-15° \leq \theta \leq \theta1+5°$, where θ1 is a refraction angle of the light emitted from the linear light source and being incident on the optical sheet, and θ is an inclination angle of each protrusion with respect to the Z direction.

Accordingly, the light reflected by an inner surface of each inclined protrusion returns to the reflection surface within the predetermined range. Thus, the unevenness in luminance can be efficiently decreased.

In the surface illuminating device, an angle θ may be determined as $\theta1-10° \leq \theta \leq \theta1-5°$, where θ1 is a refraction angle of the light emitted from the linear light source and being incident on the optical sheet, and θ is an inclination angle of each protrusion with respect to the Z direction.

Accordingly, the light reflected by an inner surface of each inclined protrusion returns to a direction away from a direction opposite to a direction in which the light is refracted when the light is incident on the optical sheet. Thus, the unevenness in luminance can be further efficiently decreased.

The surface illuminating device may further include a diffusing member arranged opposite to the linear light sources with the optical sheet interposed therebetween, the diffusing member diffusing the light emitted from the linear light sources.

Accordingly, the diffusing member has a function of diffusing the light transmitted through the optical sheet and being incident on the diffusing member and equalizing the luminance distribution of irradiation light beams. Thus, the unevenness in luminance can be reliably decreased.

In the surface illuminating device, the inclined protrusions of the optical sheet may each have a substantially triangular cross section along an XZ plane.

Accordingly, an inner surface of each protrusion has a high reflectivity and hence, the amount of light returning to the linear light sources can be increased.

In the surface illuminating device, the inclined protrusions may each have a top portion whose outer peripheral surface is a curved surface protruding in the protruding direction of the protrusion.

Accordingly, the degree of freedom for selection of the shape is increased, and the degree of freedom for control of the light incident on each protrusion can be increased. Also, an original for forming an optical sheet can be easily processed by a single cutting tool.

In the surface illuminating device, the optical sheet may contain a diffusing material which diffuses the light emitted from the linear light sources.

Accordingly, since the light incident on the optical sheet is diffused and output, the unevenness in luminance can be further decreased. In particular, when the position of the optical sheet is shifted with respect to the linear light sources, the influence of the positional shift is decreased, and hence the unevenness in luminance can be decreased.

In the surface illuminating device, the inter-light-source distance L may be 30 mm or larger.

Accordingly, the positional shift of the optical sheet with respect to the linear light sources less affects the unevenness in luminance. Hence, the unevenness in luminance can be decreased.

In the surface illuminating device, protruding directions of some protrusions located within a range of $L/10 \leq x \leq L/3$ from among the protrusions may be inclined such that the protruding directions of the protrusions are located farther from the Z direction, which is the optical axis of the linear light source located at the position of x=0 in the X direction, to the X direction as the protrusions are located farther from the position of x=0 in the X direction.

Accordingly, a major part of light emitted from the linear light source can be guided to an area next to the linear light source. Hence, the unevenness in luminance can be reliably decreased.

In the surface illuminating device, the optical sheet may have a protrusion-free portion at a portion corresponding to a substantially middle area between the adjacent linear light sources.

Accordingly, the protrusion-free portion can be used as a positioning portion for the optical sheet with respect to the linear light sources. The optical sheet can be easily and reliably positioned with respect to the linear light sources.

In the surface illuminating device, some protrusions located within a range of $L/3 < x \leq L/2$ from among the protrusions may each have a substantially semicircular cross section along an XZ plane.

Accordingly, a major part of the light emitted from the linear light source can be transmitted and output toward the diffusing member without being reflected by the inner surface. Hence, the luminance in an area near a substantially middle area between the linear light sources can be increased, and the unevenness in luminance can be reliably decreased.

The surface illuminating device may include an optical sheet assembly in which the optical sheet is bonded with the diffusing member.

Accordingly, since the thickness is increased, the rigidity can be increased. Hence, warping and waving can be prevented.

The surface illuminating device may include an optical element covering member in which the optical sheet and the diffusing member are covered with a covering member.

Accordingly, since the thickness is increased, the rigidity can be increased. Hence, warping and waving can be prevented.

In the surface illuminating device, the covering member may have diffusing property at a light incidence portion of the covering member.

Accordingly, the diffused light is incident on the optical sheet, and hence the unevenness in luminance can be further decreased. In particular, when the position of the optical sheet is shifted with respect to the linear light sources, since the light incidence portion of the covering member has the diffusing property, the influence of the positional shift is decreased, and the unevenness in luminance can be decreased.

In the surface illuminating device, the covering member may include the luminance-distribution control layer at the light incidence portion of the covering member. The light incidence portion of the covering member may serve as the optical sheet.

Accordingly, a dedicated optical sheet does not have to be provided. Hence, the cost can be decreased because of generalization of members.

In the surface illuminating device, the diffusing member may serve as a support for the optical element covering member.

Accordingly, the diffuser plate can provide a certain rigidity. Hence, the thickness of the optical sheet does not have to be increased to increase the rigidity, thereby decreasing the thickness of the surface illuminating device.

In the surface illuminating device, the covering member may have elasticity or heat shrinkability, and the covering member may closely contact a content in the covering member.

Accordingly, the optical sheet can be prevented from wrinkling even when the optical sheet expands or shrinks because of a change in temperature.

An image display apparatus according to another embodiment includes a display panel which displays an image in accordance with an image signal; and a surface illuminating device which illuminates the display panel from a back surface of the display panel. The surface illuminating device includes a plurality of linear light sources arranged in parallel to each other in a plane, a light-transmissive optical sheet including a luminance-distribution control layer formed on a light exit surface of the optical sheet, the luminance-distribution control layer decreasing unevenness in luminance of light emitted from the linear light sources, and a reflection surface positioned opposite to the optical sheet with the linear light sources interposed therebetween, the reflection surface reflecting the light emitted from the linear light sources. The luminance-distribution control layer of the optical sheet includes a plurality of protrusions, the protrusions having ridgelines extending substantially in parallel to an extending direction of the linear light sources and being arranged continuously in an arrangement direction of the linear light sources. In a range of $0 \leq x \leq L/2$, protruding directions of some or all the protrusions are inclined such that the protruding directions of the protrusions are located farther from a Z direction, which is an optical axis of a linear light source located at a position of $x=0$ in an X direction, to the X direction as the protrusions are located farther from the position of $x=0$ in the X direction, where the X direction represents the arrangement direction of the linear light sources, a Y direction represents the extending direction of the linear light sources, the Z direction represents a direction orthogonal to the X and Y directions, an inter-light-source distance L represents a distance between the centers of adjacent linear light sources from among the linear light sources, and a moving distance x represents a distance when light emitted from one of the adjacent linear light sources is directed toward the other of the adjacent linear light sources.

Accordingly, in the range of $0 \leq x \leq L/2$, the amount of light to be transmitted through the optical sheet is gradually increased as the protrusions are located farther from the position of $x=0$ in the X direction. Also, the luminance distribution of the light is substantially equalized without decreasing the inter-light-source distance L. Thus, the unevenness in luminance can be decreased without increasing the power consumption.

Additional features and advantages are described herein, and will be apparent from the following Detailed Description and the figures.

DETAILED DESCRIPTION

Preferred embodiments for implementing a surface illuminating device and an image display apparatus will be described below with reference to the attached drawings.

In the preferred embodiments given below, a surface illuminating device is applied to a backlight device of an image display apparatus. It is to be noted that the application of the surface illuminating device is not limited to the backlight device of the image display apparatus, and the surface illuminating device may be applied to various apparatuses for lighting provided in image display apparatuses.

Figure 1:
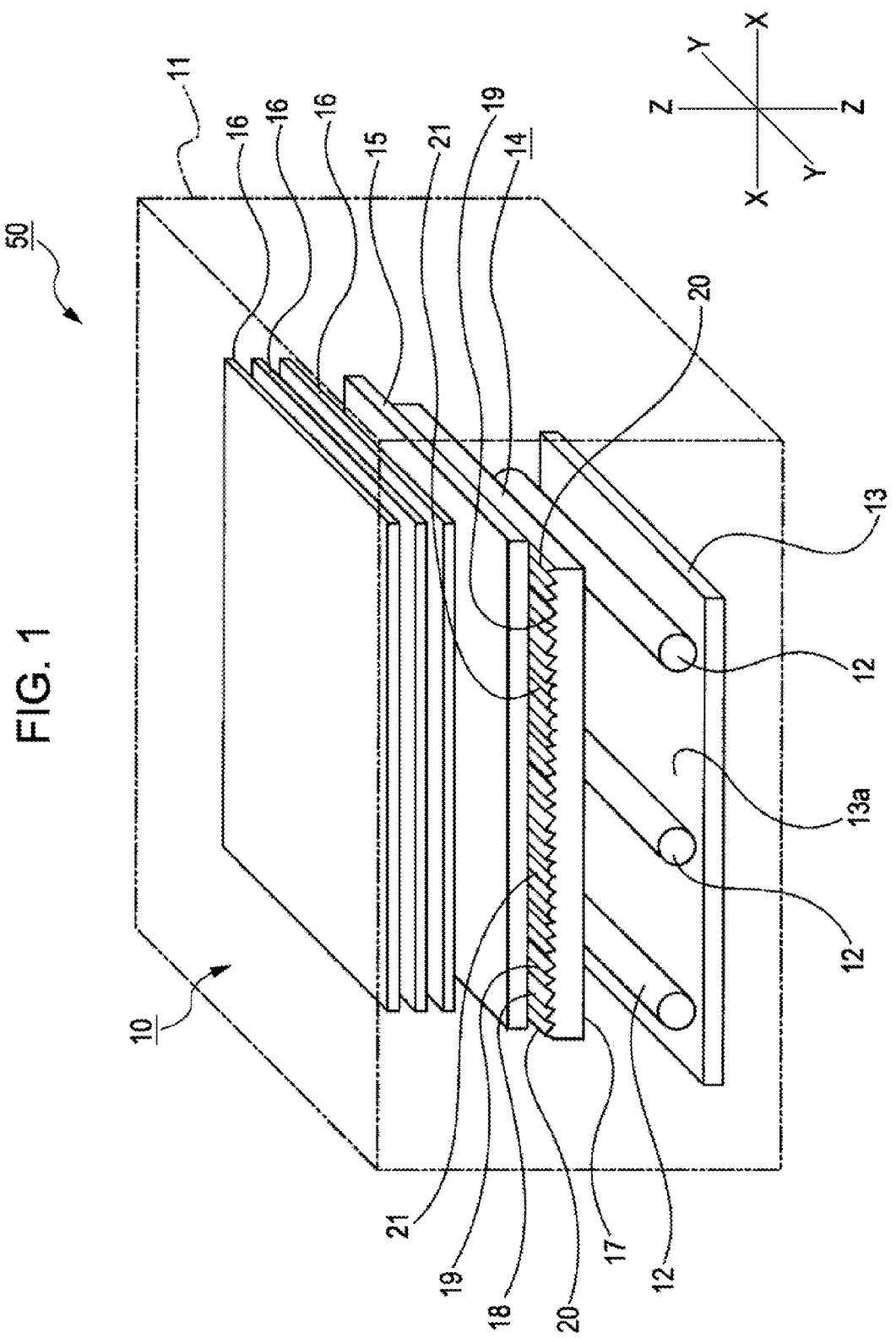
FIG. 1, together with FIGS. 2 to 16, and 18 to 21, illustrates a surface illuminating device and an image display apparatus according to an embodiment, and is a schematic perspective view showing the image display apparatus.
Figure 2:
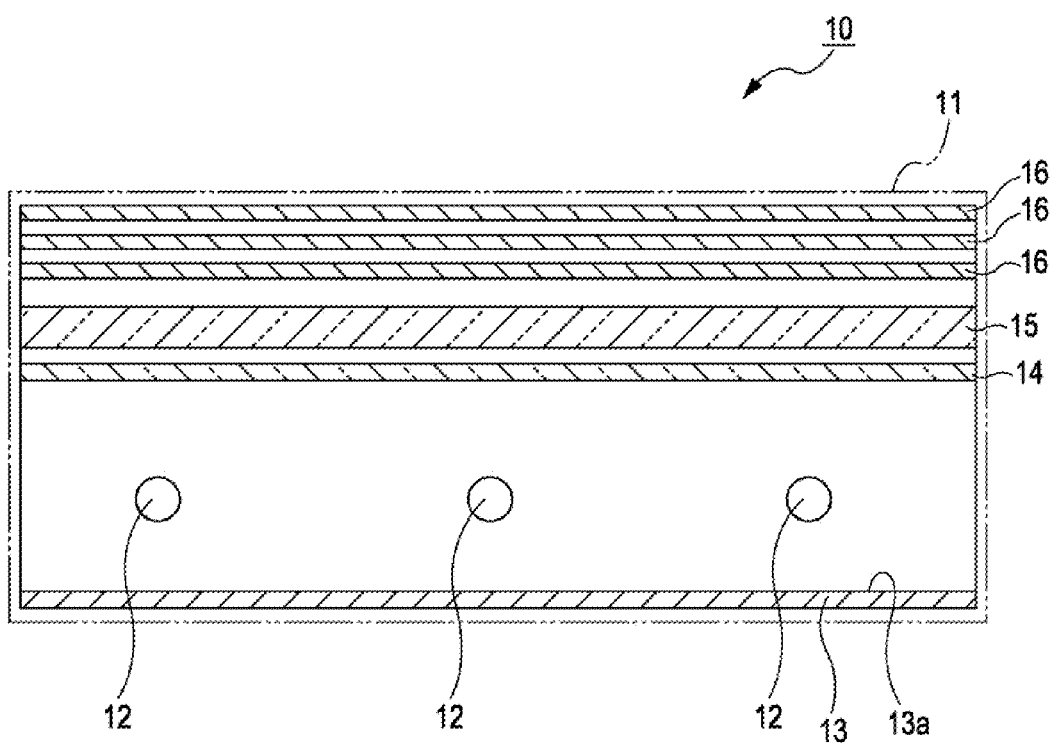
FIG. 2 is a schematic cross-sectional view showing the image display apparatus.

A surface illuminating device 10 is used as a direct back light type backlight device for an image display apparatus 50 (see FIGS. 1 and 2).

The surface illuminating device 10 has components arranged in a casing 11. The surface illuminating device 10 includes a plurality of linear light sources 12, a reflector plate 13, an optical sheet 14, a diffuser plate 15, and a plurality of functional sheets 16.

The linear light sources 12 may employ, for example, fluorescent lamps, such as cold cathode fluorescent lamps (CCFLs) or hot cathode fluorescent lamps (HCFLs). The linear light sources 12 each have a columnar shape and are arranged to extend in a Y direction shown in FIG. 1. The linear light sources 12 are arranged between the reflector plate 13 and the optical sheet 14, in parallel to an X direction shown in FIG. 1 at an interval.

Each linear light source 12 is not limited to a fluorescent lamp. For example, spot light sources such as light emitting diodes (LEDs) may be arranged adjacently to each other in the Y direction in a line as its entirety, to serve as a linear light source 12.

A distance between the centers of the linear light sources 12 in the X direction defines an inter-light-source distance L, which is, for example, 30 mm or larger.

In the surface illuminating device 10, as described above, the plurality of linear light sources 12 are arranged in the X direction at an interval, and hence, the arrangement state has uniformity. Thus, when light emitted from the linear light sources 12 reaches a display panel (described later), local unevenness in luminance depending on the arrangement state of the linear light sources 12 hardly occurs.

The reflector plate 13 faces the linear light sources 12 in a Z direction. A surface of the reflector plate 13 facing the linear light sources 12 is a reflection surface 13a. Part of the light emitted from the linear light sources 12 is reflected by the reflection surface 13a to the optical sheet 14.

The reflection surface 13a can have a function of diffuse reflection in addition to a function of specular reflection. For the functions of specular reflection and diffuse reflection, resin which is colored white may be used as the reflector plate 13. In this case, it is desirable to have a high light reflectivity.

For example, a material for the reflector plate 13 having the high light reflectivity may be a resin material, such as polyethylene terephthalate (PET), polycarbonate, or polybutylene terephthalate. Alternatively, the reflector plate 13 may use a metal material such as aluminum.

The optical sheet 14 is arranged opposite to the reflector plate 13 with the linear light sources 12 arranged therebetween. The optical sheet 14 is, for example, a light-transmissive prism sheet or lenticular lens sheet. The optical sheet 14 is, for example, formed by integrally providing a luminance-distribution control layer 18 on a light exit surface of a base 17. Alternatively, the optical sheet 14 may be formed such that, for example, UV-curable resin is transferred on polyethylene terephthalate (PET), thereby providing the luminance-distribution control layer 18.

Resin (thermoplastic resin) used for the optical sheet 14 can have a refractive index of 1.4 or higher to provide a function of controlling a light emitting direction. Such resin may be, for example, acrylic resin, such as polycarbonate resin or polymethylmethacrylate (PMMA) resin, polyolefin resin, such as polyethylene (PE) or polypropylene (PP), polyester resin such as polyethylene terephthalate, amorphous copolymer polyester resin such as MS (methyl methacrylate-styrene) copolymer, polystyrene resin, polyvinyl chloride resin, cycloolefin resin, urethane resin, natural rubber resin, artificial rubber resin, or a combination of these materials.

The luminance-distribution control layer 18 has a function of decreasing unevenness in luminance of light emitted from the linear light sources 12. The luminance-distribution control layer 18 includes a plurality of protrusions 19, 20, and 21 (see FIGS. 1 and 3), a ridgeline direction extending in the Y direction in FIG. 1. The protrusions 19, 20, and 21 are provided continuously in the X direction at predetermined pitches.

Figure 3:
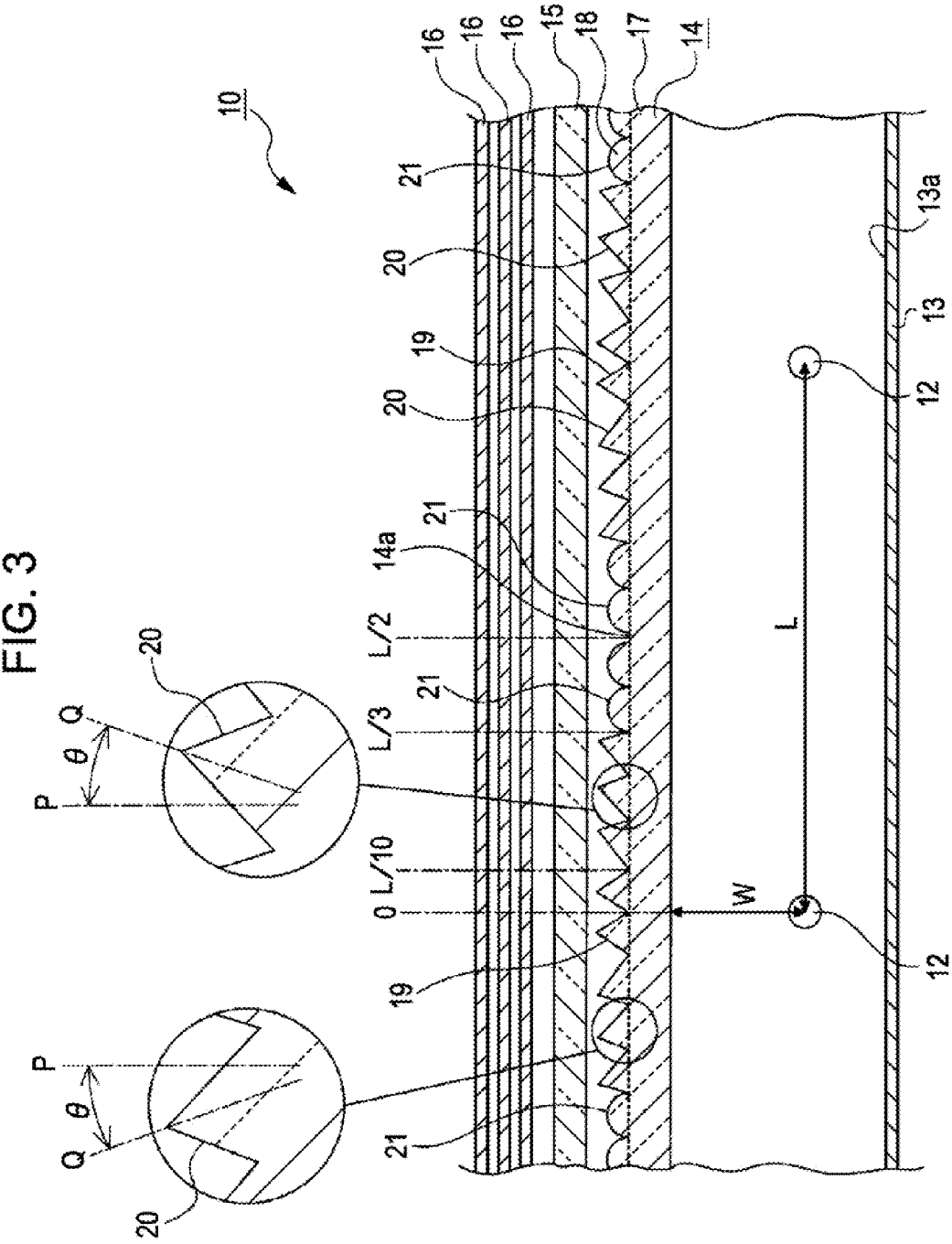
FIG. 3 is a schematic enlarged cross-sectional view showing the image display apparatus.

Referring to FIG. 3, the protrusions 19 are provided directly above the linear light sources 12. For example, each protrusion 19 has a cross section along the XZ plane of a substantially isosceles triangle or a substantially equilateral triangle. The protrusions 19 protrude from the base 17 in the Z direction in FIG. 1, that is, in an optical axis direction of the light emitted from the linear light sources 12.

Referring to FIG. 3, the protrusions 20 are provided in outer peripheral areas of the positions directly above the linear light sources 12 continuously outward from the protrusions 19. For example, each protrusion 20 has a substantially triangular cross section along the XZ plane. The protrusions 20 are provided in a range of from the corresponding linear light source 12 to L/2 and protrude from the base 17 in an inclined direction such that the protruding direction of the protrusion 20 is located farther from the Z direction, which is the optical axis of the light emitted from the linear light source 12 at the position of x=0 in the X direction, to the X direction as the protrusion is located farther from the position of x=0 in the X direction. In particular, referring to an enlarged view in FIG. 3, a protruding direction Q of each protrusion 20 from the base 17 is inclined at an angle θ outward from a perpendicular line P with respect to the linear light source 12 located nearest to the protrusion 20.

The protrusions 20 do not have the same inclination angle θ to the perpendicular line P, and have a plurality of different angles θ. The angles θ vary in the X direction continuously or step by step.

Referring to FIG. 3, the protrusions 21 are provided directly above substantially middle areas between the linear light sources 12. For example, each protrusion 21 has a substantially semicircular cross section along the XZ plane.

Arrangement pitches of the protrusions 19, 20, and 21 are arranged at very small pitches irrespective of an arrangement pitch of the linear light sources 12.

The protrusions 19, 20, and 21 preferably extend in an extending direction (Y direction) of the linear light sources 12. However, ridgelines of the protrusions 19, 20, and 21 may be inclined within a range permissible for an optical characteristic, with respect to the extending direction of the linear light sources 12. Also, the ridgelines of the protrusions 19, 20, and 21 may wave in vertical and horizontal directions within a range permissible for the optical characteristic.

When the plurality of spot light sources such as LEDs are arranged in a line in the Y direction to define the linear light source 12, two optical sheets 14 may be arranged to be orthogonal to the ridgelines of the protrusions 19, 20, and 21.

The diffuser plate 15 is arranged opposite to the linear light sources 12 with the optical sheet 14 interposed therebetween. The diffuser plate 15 diffuses light transmitted through the optical sheet 14 and being incident on the diffuser plate 15 so as to equalize a luminance distribution of irradiation light beams.

For example, the diffuser plate 15 is an optical member with a high rigidity having a diffusing layer which is formed by dispersing a diffusing material (filler) in a relatively thick transparent resin plate.

The diffuser plate 15 also functions as a support for supporting other optical members, for example, the optical sheet 14 and function sheets (diffusing sheet, prism sheet, reflective polarizing sheet etc.) 16. The diffuser plate 15 may be provided by combining a member in which a diffusing material is dispersed in a relatively thick transparent resin plate, with a member in which transparent resin (binder) containing a diffusing material is applied on a relatively thin transparent resin film. The transparent resin plate or film may use light-transmissive thermoplastic resin, such as PET, acryl, or polycarbonate.

If the thickness of a diffusing layer of the diffuser plate 15 is smaller than 1 mm, light diffusing property may be decreased, and rigidity may be insufficient when the diffuser plate 15 is held by the casing 11. In contrast, if the thickness of the diffusing layer is larger than 5 mm, when the diffuser plate 15 is heated by the light from the linear light sources 12, it may be difficult to radiate the heat, and hence the diffuser plate 15 may be bent. Thus, the diffusing layer of the diffuser plate 15 preferably has a thickness of 1 to 5 mm.

The diffusing material is formed of, for example, particles with a mean particle diameter of 0.5 to 10 μm. The diffusing material is dispersed in the transparent resin by an amount ranging from 0.1 to 10 parts by weight with respect to an entire weight of the diffusing layer. The diffusing material may be an organic filler or an inorganic filler. Alternatively, the diffusing material may be hollow particles.

As long as the mean particle diameter of the diffusing material is in the range of from 0.5 to 10 μm, and the diffusing material is dispersed in the transparent resin by the amount in the range of from 0.1 to 10 parts by weight with respect to the entire weight of the diffusing layer, an effect of the diffusing material efficiently appear. Also, with a combination of the diffusing material with the optical sheet 14, unevenness in luminance can be efficiently decreased.

Light emitted from the linear light sources 12 and transmitted through the optical sheet 14 is reflected and refracted by the luminance-distribution control layer 18, and the light has a directivity in a specific direction. The directivity depends on an arrival position at the optical sheet 14 of light in the X direction. The diffuser plate 15 has a function of averaging the directivity of the optical sheet 14, and forming a uniform luminance distribution irrespective of a viewing direction.

Figure 4:
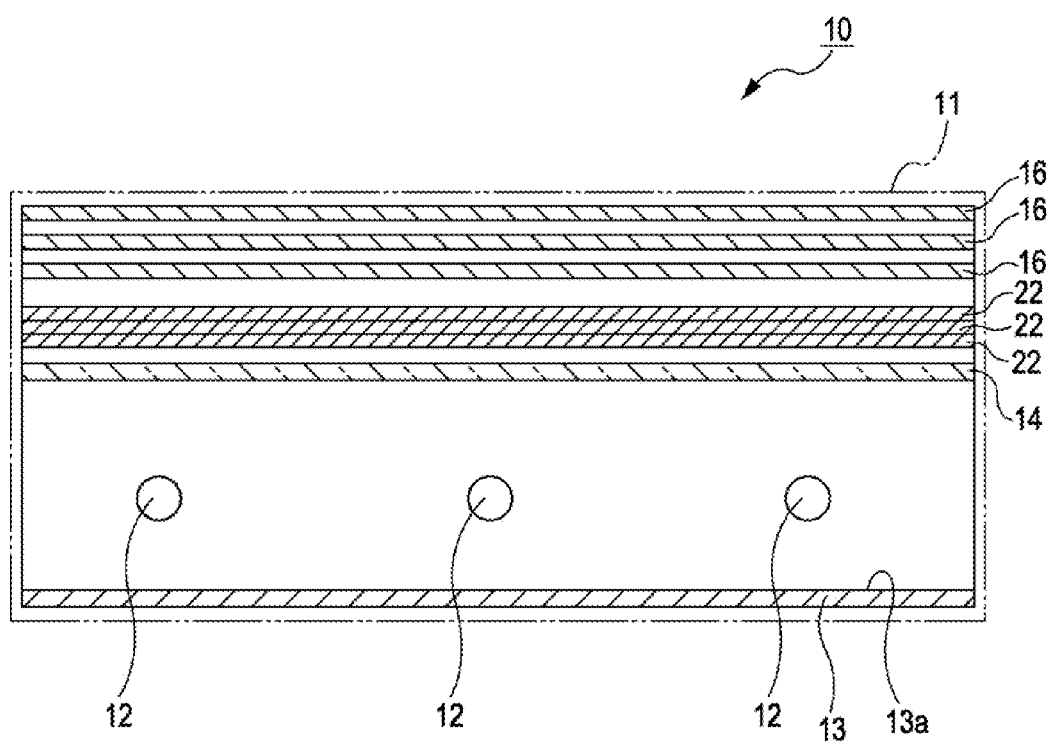
FIG. 4 is a schematic cross-sectional view showing another example of an image display apparatus.

Instead of the diffuser plate 15, a plurality of diffusing sheets 22 may be used as shown in FIG. 4. However, regarding a loss of light and an increase in cost by stacking the diffusing sheets 22, the diffuser plate 15 is advantageous rather than the plurality of diffusing sheets 22.

Referring to FIGS. 1 to 3, the function sheets 16 are arranged opposite to the optical sheet 14 with the diffuser plate 15 interposed therebetween. The function sheets 16 are formed of, for example, one or plural sheets of a diffusing sheet, a prism sheet, and a reflective polarizing sheet. When the function sheet 16 is formed of a plurality of sheets, the sheets are stacked on one another in a layer manner.

The diffusing sheet used as the function sheet 16 is, for example, a thin sheet formed by applying transparent resin containing a diffusing material on a transparent resin film. The diffusing sheet has a function of diffusing light transmitted through the optical sheet 14 and the diffuser plate 15.

The prism sheet used as the function sheet 16 is a sheet in which a plurality of protrusions are continuously formed on a light exit surface. Each protrusion preferably extends in a direction in which the linear light sources 12 extend. However, each protrusion may be inclined with respect to the direction in which the linear light sources 12 extend, within a range permissible for an optical characteristic. The prism sheet has a function of allowing a component of light in an arrangement direction of each protrusion from among incident light to be refracted and transmitted in an optical axis direction, and increasing the directivity.

The prism sheet may be integrally formed by a light transmissive resin material, for example, thermoplastic resin. Alternatively, the prism sheet may be formed by transferring, for example, UV-curable resin on a light-transmissive base, for example, polyethylene terephthalate (PET).

The thermoplastic resin preferably has a refractive index of 1.4 or higher to provide a function of controlling a light emitting direction. Such resin may be, for example, acrylic resin, such as polycarbonate resin or polymethylmethacrylate (PMMA) resin, polyester resin such as polyethylene terephthalate, amorphous copolymer polyester resin such as MS (methyl methacrylate-styrene) copolymer, polystyrene resin, or polyvinyl chloride resin.

The reflective polarizing sheet used as the function sheet 16 has, for example, a multilayer structure in which layers having different refractive indices are alternately stacked. The reflective polarizing sheet has a function of dividing the light with its directivity enhanced by the prism sheet into P and S waves, transmitting only the P wave, and selectively reflecting the S wave. The reflected S wave is reflected by the reflection surface 13a of the reflector plate 13. At this time, the waves are separated into the P wave and the S wave. Hence, the S wave reflected by the reflective polarizing sheet can be reused. The reflective polarizing sheet is formed by pinching the above-mentioned multilayer structure with a pair of diffusing layers. The reflective polarizing sheet has a function of increasing a viewing angle by diffusing the P wave transmitted through the multilayer structure using the diffusing layers on both surfaces of the reflective polarizing sheet.

A display panel (not shown) is arranged at a light exit surface of the function sheets 16.

The display panel is, for example, a liquid crystal display panel, having a layered structure in which a liquid crystal layer is arranged between a pair of transparent substrates. In particular, a polarizing plate, a transparent substrate, a color filter, a transparent electrode, an alignment film, a liquid crystal layer, an alignment film, a transparent pixel electrode, a transparent substrate, and a polarizing plate are stacked in that order from an outer surface.

The plurality of polarizing plates are stacked, thereby providing a function as an optical shutter, to allow light in a predetermined vibration direction (polarized light) to be transmitted through the optical shutter. The polarizing plates are arranged such that their polarizing axes are shifted from each other by 90°. Hence, light emitted from the linear light sources 12 is transmitted through or shut at the liquid crystal layer in accordance with the type of polarized light.

The transparent substrates are formed of transparent substrates for visible light, for example, plates made of a glass material. The inner transparent substrate has an active type drive circuit including a thin film transistor (TFT) as a driving element electrically connected with the transparent pixel electrode and wiring etc.

The color filter includes color filters for separating the light emitted from the linear light sources 12 into three primary colors of red (R), green (G), and blue (B).

The transparent electrode is formed of, for example, indium tin oxide (ITO), and functions as a common counter electrode.

The alignment films are formed of a polymeric material such as polyimide, and perform alignment processing for liquid crystal.

The liquid crystal layer is formed of liquid crystal of, for example, vertical alignment (VA) mode, twisted nematic (TN) mode, or super twisted nematic (STN) mode. The liquid crystal layer has a function of allowing respective pixels to transmit or shut the light emitted from the linear light sources 12 by voltages applied from the drive circuit.

The transparent pixel electrode is formed of, for example, ITO, and functions as an electrode for each pixel.

In the above-described surface illuminating device 10, when the light is emitted from the linear light sources 12, the emitted light is transmitted through the optical sheet 14, the diffuser plate 15, and the function sheets 16 in that order, and the transmitted light is emitted on the display panel. At this time, part of the emitted light is reflected by the reflection surface 13a of the reflector plate 13 and directed to the optical sheet 14. Also, part of the light incident on the optical sheet 14 is reflected by an inner surface of the luminance-distribution control layer 18, and directed to the reflection surface 13a of the reflector plate 13.

The light incident on the optical sheet 14 is refracted by a light incidence surface of the optical sheet 14, and refracted by an exit surface of the optical sheet 14 again. Then, the light is directed to the diffuser plate 15. The light incident on the diffuser plate 15 is diffused and output, and reaches the display panel through the function sheets 16.

Figure 5:
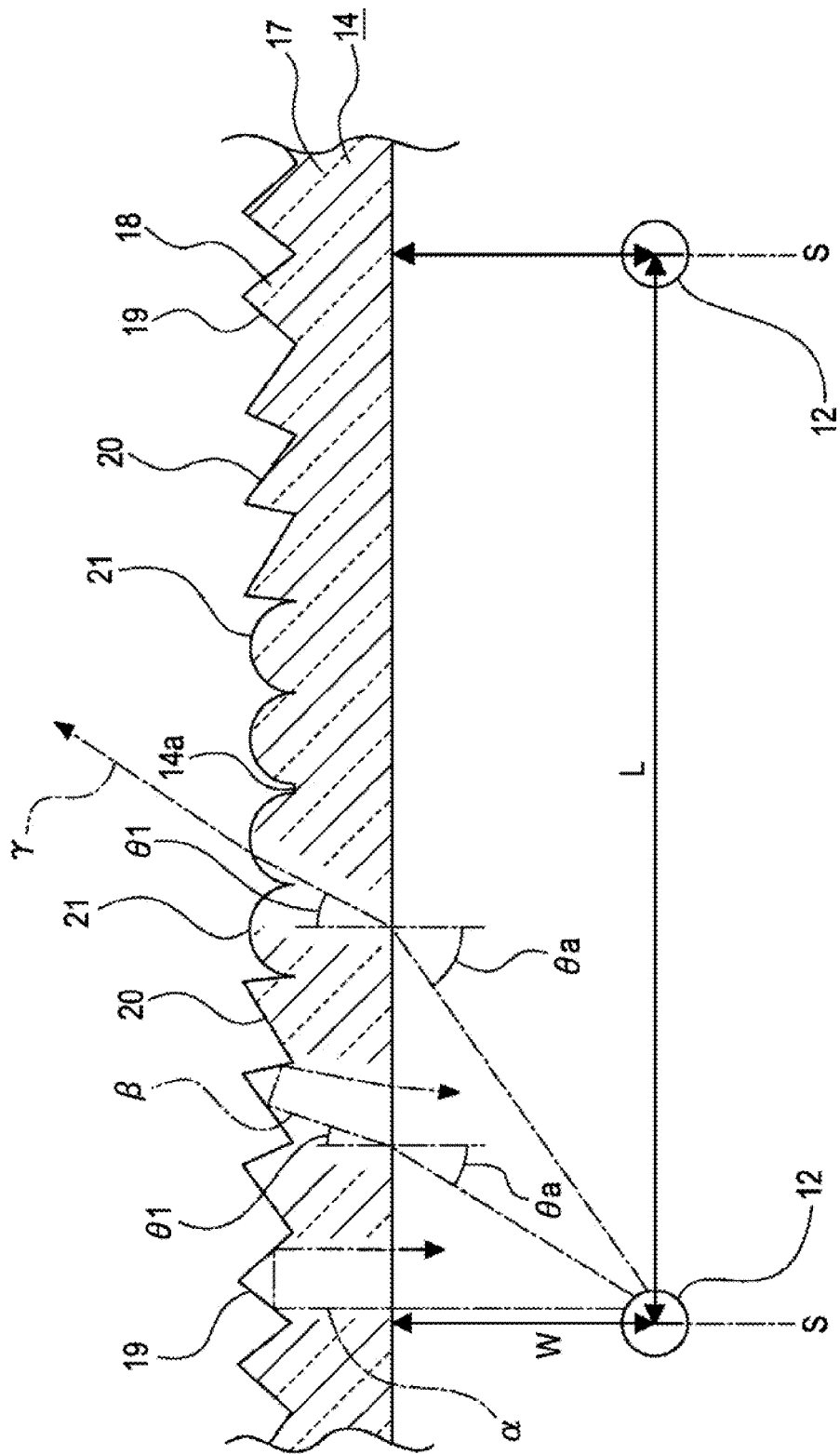
FIG. 5 is a conceptual diagram showing a path of light emitted from a linear light source.

FIG. 5 illustrates a path of light emitted from the linear light source 12 and a positional relationship among respective components of the luminance-distribution control layer 18 if the optical sheet 14.

In FIG. 5, an inter-light-source distance L represents a distance between the centers of the adjacent linear light sources 12, an optical-axis-direction distance W represents a distance between the center of each linear light source 12 and the optical sheet 14 in an optical-axis S direction (Z direction), θa represents a light incidence angle of the light emitted from the linear light source 12 and being incident on the optical sheet 14 with respect to an optical axis S of the light, and θ1 represents a refraction angle at the optical sheet 14 of the light incident on the optical sheet 14.

The surface illuminating device 10 has the inter-light-source distance L of, for example, 30 mm or larger.

FIG. 5 exaggerates the sizes of the protrusions 19, 20, and 21 of the luminance-distribution control layer 18 with respect to the base 17 of the optical sheet 14. Actually, the sizes of the protrusions 19, 20, and 21 are very small with respect to the base 17.

Figure 6:
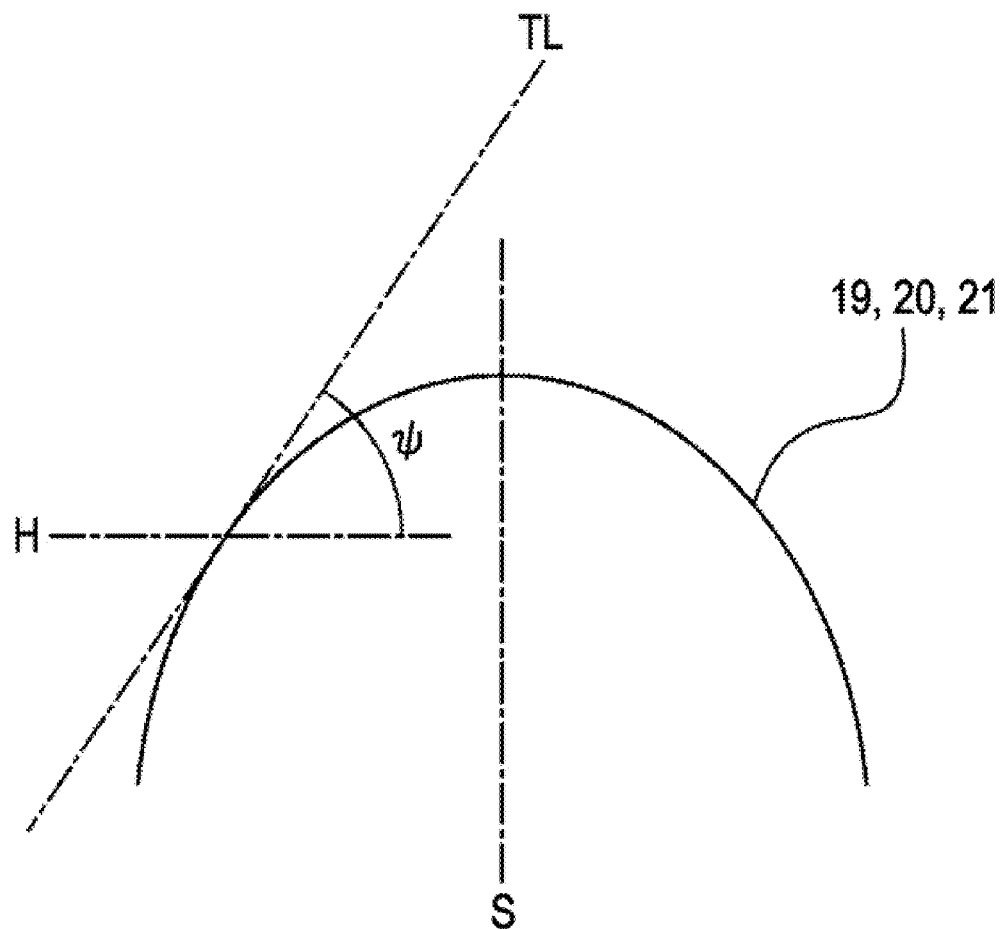
FIG. 6 is a conceptual diagram showing an angle of a protrusion at a luminance-distribution control layer.

Also, referring to FIG. 6, regarding a cross-sectional shape along the XZ plane of the luminance-distribution control layer 18, a tangential angle ψ represents an angle defined by a tangent TL adjacent to an outer surface of each of the protrusions 19, 20, and 21, and a plane H orthogonal to the optical axis S.

In the surface illuminating device 10, since the protrusion 19 has a cross section of a substantially isosceles triangle or a substantially equilateral triangle, a major part of the light emitted from the linear light sources 12 and being incident on the protrusions 19 of the optical sheet 14 is reflected by an inner surface and returns to the reflector plate 13 (see path α in FIG. 5).

Since the protrusion 20 has a substantially triangular cross section, and the protruding direction of the protrusion 20 is inclined in the X direction with respect to the optical axis, the light emitted from the linear light source 12 and being incident on the protrusion 20 of the optical sheet 14 is reflected by an inner surface and is likely guided toward an area next to the linear light source 12 (see path β in FIG. 5).

Since the protrusion 21 has a semicircular cross section, a major part of the light emitted from the linear light source 12 and being incident on the protrusion 21 of the optical sheet 14 is transmitted therethrough and output toward the diffuser plate 15 (see path γ in FIG. 5).

Assuming that a movement distance x represents a distance when the light emitted from the linear light source 12 is directed toward the adjacent linear light source 12, when $0 \leq x \leq L/2$, the amount of light transmitted through the optical sheet 14 is gradually increased as the position of the light comes farther from the linear light source 12. Hence, the luminance distribution of the light emitted from the linear light source 12 and transmitted through the optical sheet 14 is substantially equalized without decreasing the inter-light-source distance L. Variation in luminance can be decreased without increasing power consumption.

The positions of the protrusions 20 of the optical sheet 14 to decrease the unevenness in luminance are preferably located within a range of $L/10 \leq x \leq L/3$ based on the position directly above the linear light source 12, i.e., x=0 (see FIG. 3). The positions of the protrusions 19 are preferably located within a range of $0 \leq x < L/10$ based on the position directly above the linear light source 12. The positions of the protrusions 21 are preferably located within a range of $L/3 < x \leq L/2$ based on the position directly above the linear light source 12.

As described above, since the positions of the protrusions 20 are arranged within the range of $L/10 \leq x \leq L/3$, a major part of the light emitted from the linear light source 12 can be guided to an area next to the linear light source 12. Accordingly, the unevenness in luminance can be reliably decreased.

Also, since the positions of the protrusions 21 each having the semicircular cross section are arranged within the range of L/3<x≦L/2, a major part of the light emitted from the linear light source 12 can be transmitted toward the diffuser plate 15 without being reflected by the inner surface, and the light can be output. Accordingly, the luminance at a position near the substantially middle area between the linear light sources 12 can be increased, thereby reliably decreasing the unevenness in luminance.

Figure 7:
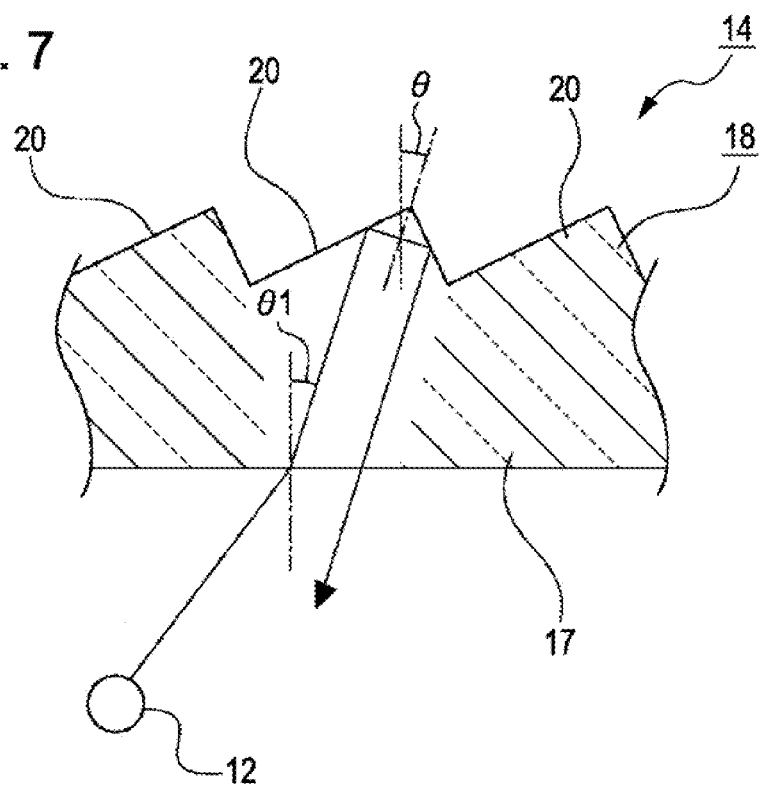
FIG. 7, together with FIG. 8, illustrates a path of light emitted from a linear light source, and is a conceptual diagram showing a case where a refraction angle and an inclination angle are equal.
Figure 8:
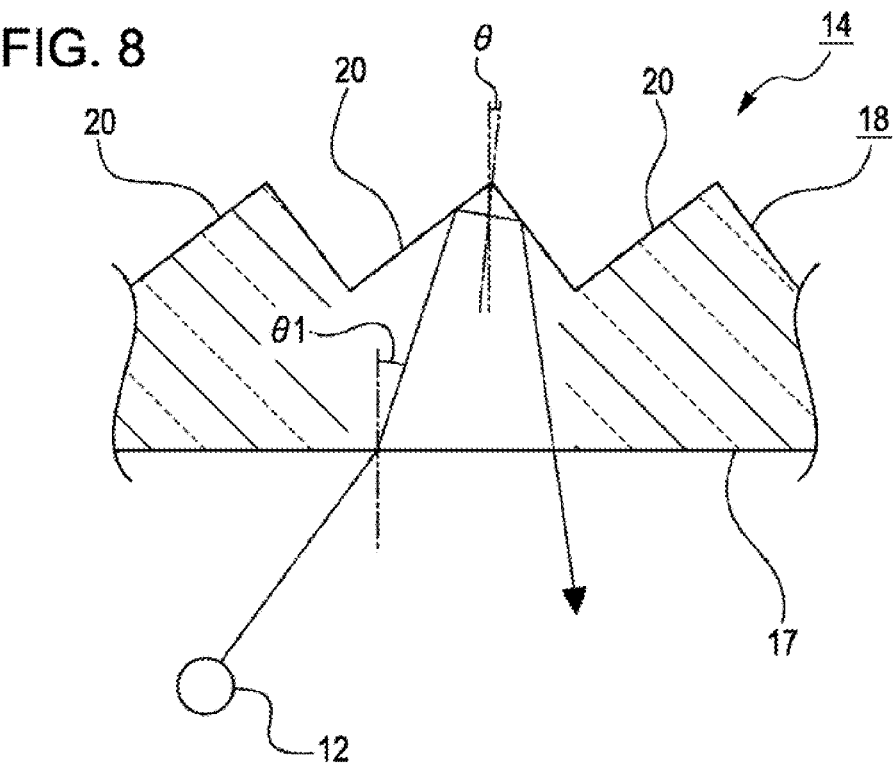
FIG. 8 is a conceptual diagram showing a case where an inclination angle is smaller than a refraction angle.

FIGS. 7 and 8 each illustrate paths of light emitted from the linear light source 12 and being incident on the protrusion 20 of the optical sheet 14. FIGS. 7 and 8 show a case where the protrusion 20 is an inclined isosceles triangle in a cross section along the XZ plane had has an inclination angle θ.

In a situation where the light incident on the optical sheet 14 is reflected by the inner surface of the protrusion 20 and returns toward the linear light source 12, the light returns to a direction opposite to a direction in which the light is refracted if a refraction angle θ1 when the light is incident on the optical sheet 14 is equal to the inclination angle θ at the protrusion 20 (see FIG. 7).

If the inclination angle θ of the protrusion 20 is smaller than the refraction angle θ1 when the light is incident on the optical sheet 14, the light returns in a direction away from the linear light source 12 (see FIG. 8).

As described above, the path of light reflected by the inner surface of the protrusion 20 is determined by the inclination angle θ with respect to the refraction angle θ1.

In the surface illuminating device 10, each protrusion 20 may be preferably formed such that an angle θ for decreasing the unevenness in luminance satisfies the following equation:

$$\theta 1-15° \leq \theta \leq \theta 1+5°.$$

By providing the protrusions 20 with the above-mentioned inclination angle θ on the optical sheet 14, the unevenness in luminance can be efficiently decreased.

More preferably, the protrusions 20 may be formed such that the angle θ satisfies the following equation:

$$\theta 1-10° \leq \theta \leq \theta 1-5°.$$

By providing the protrusions 20 with the above-mentioned inclination angle θ on the optical sheet 14, the unevenness in luminance can be further efficiently decreased.

In the surface illuminating device 10, the diffuser plate 15, which diffuses the light emitted from the linear light sources 12, is arranged opposite to the linear light sources 12 with the optical sheet 14 interposed therebetween.

The diffuser plate 15 has the function of diffusing the light transmitted through the optical sheet 14 and being incident on the diffuser plate 15 and equalizing the luminance distribution of the irradiation light beams. Accordingly, the unevenness in luminance can be reliably decreased. In particular, as described above, the diffuser plate 15 has the function of equalizing the directivity of the optical sheet 14 and forming the uniform luminance distribution irrespective of the viewing direction. Hence, by providing the diffuser plate 15, the unevenness in luminance can be decreased irrespective of the viewing angle.

Even when a plurality of diffusing sheets 22 are used instead of the diffuser plate 15, a similar advantage can be obtained.

Figure 9:
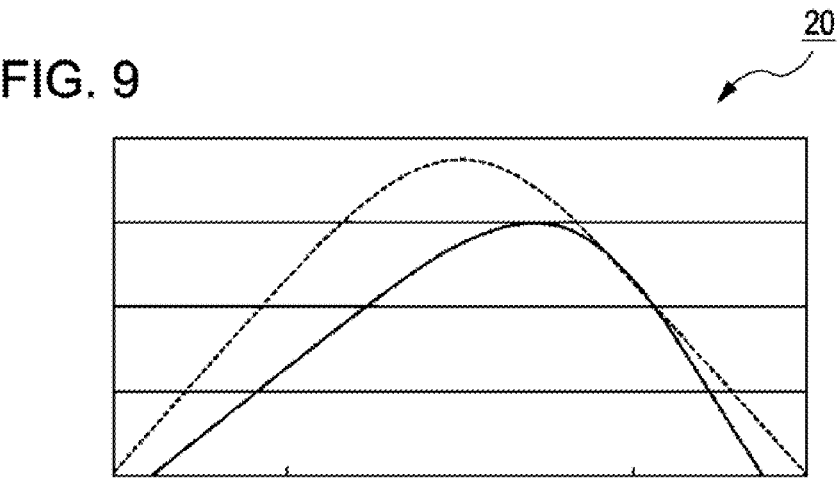
FIG. 9, together with FIGS. 10 and 11, illustrates an exemplary shape of a protrusion, and is a conceptual diagram showing an example in which the shape is substantially triangular with a vertex of the protrusion rounded.
Figure 10:
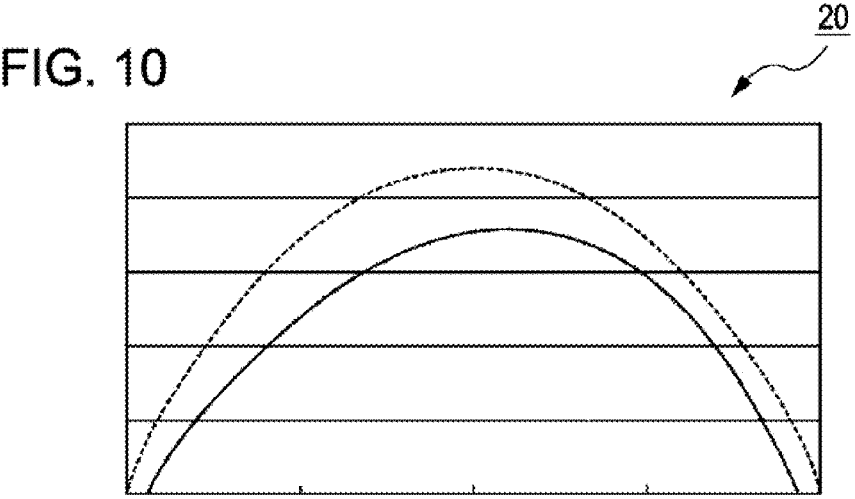
FIG. 10 is a conceptual diagram showing an example in which a protrusion has a substantially semicircular shape.
Figure 11:
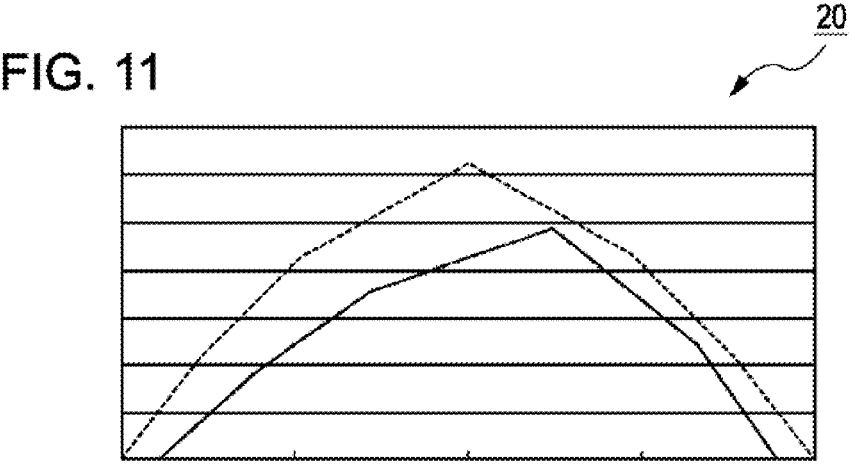
FIG. 11 is a conceptual diagram showing an example in which a protrusion has a polygonal mount whose outer peripheral surface is defined by a plurality of continuously arranged straight lines.

FIGS. 9 to 11 each conceptually illustrate an example shape of a cross section along the XZ plane of the protrusion 20. In each drawing, a broken line represents a state where the protrusion 20 is not inclined.

FIG. 9 illustrates an example of a protrusion 20 which has a substantially triangular shape whose outer peripheral surface 20b at a top portion 20a is a curved surface. FIG. 10 illustrates an example of a protrusion 20 which is substantially semicircular. FIG. 11 illustrates an example of a protrusion 20 which has a polygonal mount whose outer peripheral surface is defined by a plurality of continuously arranged straight lines.

When the protrusion 20 has the substantially triangular shape as shown in FIG. 9, the reflectivity of light of the protrusion 20 at the inner surface is increased, and hence the amount of return light toward the linear light source 12 can be increased.

When the outer peripheral surface 20b at the top portion 20a of the protrusion 20 is the curved surface, the degree of freedom for selection of the shape is increased, and the degree of freedom for control of light incident on the protrusion 20 is increased.

Further, the optical sheet 14 may contain a diffusing material, which diffuses the light emitted from the linear light source 12. When the optical sheet 14 contains the diffusing material, the light incident on the optical sheet 14 is diffused and output toward the liquid crystal panel. Accordingly, the unevenness in luminance can be further decreased.

In particular, when the position of the optical sheet 14 is shifted with respect to the linear light sources 12, for example, when the optical sheet 14 is shifted from the linear light sources 12 in the arrangement direction of the linear light sources 12, or when the direction of the ridgelines of the protrusions 19, 20, and 21 are inclined with respect to the extending direction of the linear light sources 12, the unevenness in luminance may appear. Even in this case, since the optical sheet 14 contains the diffusing material, the influence of the positional shift can be decreased, and the unevenness in luminance can be decreased.

Also, as described above, when the position of the optical sheet 14 is shifted with respect to the linear light sources 12, the unevenness in luminance may appear. However, the unevenness in luminance more likely appears when the arrangement pitch of the linear light sources 12 is small. For example, when the position of the optical sheet 14 is shifted with respect to the linear light sources 12 by 1 mm, the shift rate becomes 5% when the inter-light-source distance L is 20 mm, whereas the shift rate becomes 2.5% when the inter-light-source distance L is 40 mm. Thus, as the inter-light-source distance L is larger, the shift rate is smaller, and hence, the unevenness in luminance less appears.

Therefore, as described above, by setting the arrangement pitch of the linear light sources 12 to at least 30 mm, the influence of the positional shift of the optical sheet 14 with respect to the linear light sources 12 less affects the unevenness in luminance, thereby decreasing the unevenness in luminance.

Further, regarding the shapes of the protrusions 19, 20, and 21, the tangential angle ψ (see FIG. 6) may be preferably increased from the tip end portion toward the base 17 continuously or discontinuously. As such shapes, the shapes shown in FIGS. 9 to 11 are more preferable.

The optical sheet 14 may have a protrusion-free portion 14a in an area corresponding to the substantially middle area between the adjacent linear light sources 12, no protrusion 19, 20, or 21 being present in the protrusion-free portion 14a (see FIG. 3). The protrusion-free portion 14a may have a width ranging from about 10 to 100 μm in the X direction.

By providing the protrusion-free portion 14a in the optical sheet 14, the protrusion-free portion 14a can be used as a positioning portion of the optical sheet 14 with respect to the linear light sources 12. Hence, the optical sheet 14 can be easily and reliably positioned with respect to the linear light sources 12.

The middle area between the linear light sources 12 is preferably used as an area which maximally transmits the light emitted from the linear light sources 12. Hence, by providing the protrusion-free portion 14a between the linear light sources 12, the light emitted from the linear light sources 12 is likely transmitted toward the diffuser plate 15.

Figure 12:
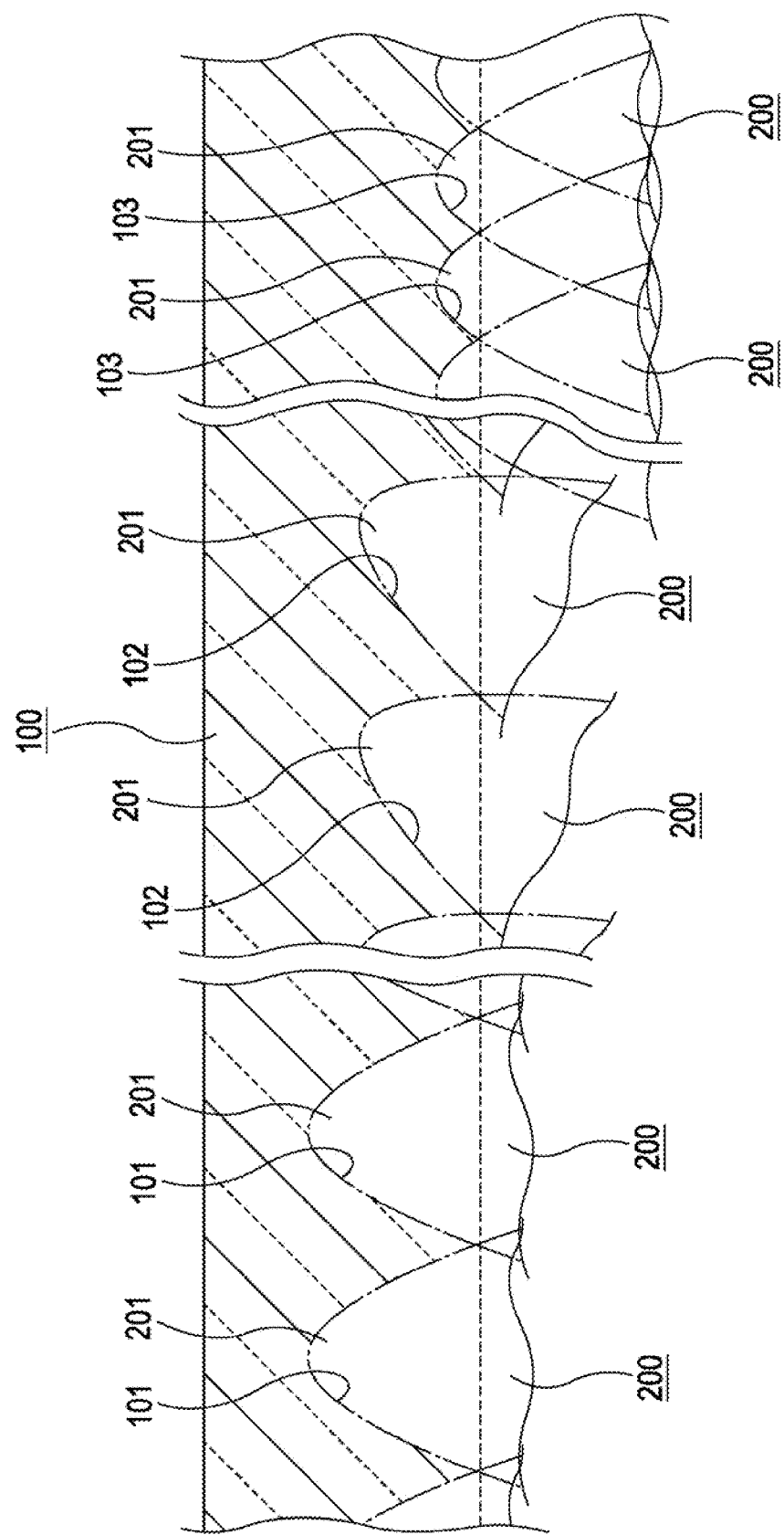
FIG. 12, together with FIG. 13, illustrates a method of manufacturing an optical sheet, and is a conceptual diagram showing a state where an original is cut by a cutting tool.
Figure 13:
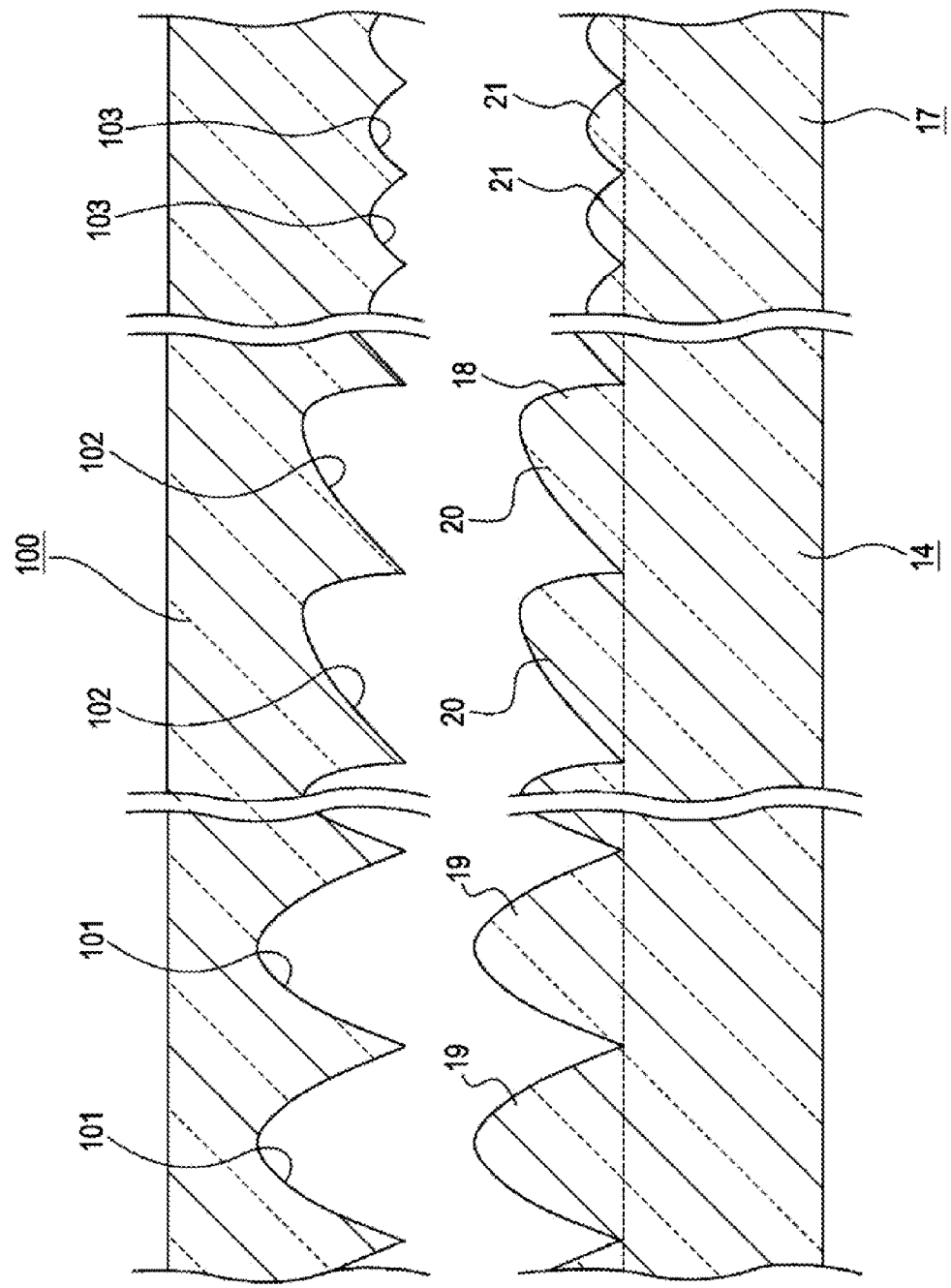
FIG. 13 is a conceptual diagram showing a state where a shape of the original is transferred and hence a luminance-distribution control layer is formed.

Now, a method of manufacturing the optical sheet 14 is described (see FIGS. 12 and 13).

An original 100 is prepared, and recesses 101, 102, and 103 having predetermined sizes and shapes are formed by cutting with a cutting tool 200 (see FIG. 12). The cutting tool 200 has a triangular shape with a predetermined size. By pressing the cutting tool 200 to and cutting the original 100, the recesses 101, 102, and 103 are formed. The cutting tool 200 has a top portion 201 formed into a substantially semicircle, and the entire cutting tool 200 is formed to be substantially triangular.

For example, referring to FIG. 12, the cutting tool 200 is pressed to the original 100 in a direction such that the cutting tool 200 is horizontally symmetric, and cuts the original 100 while moving upward by a relatively large distance, thereby forming the recess 101. The recess 101 is, for example, a groove for forming the protrusion 19.

Also, the cutting tool 200 is pressed to and cutting the original 100 in an inclined direction, thereby forming the recess 102. The recess 102 is, for example, a groove for forming the protrusion 20.

Further, the cutting tool 200 is pressed to and cutting the original 100 in a direction such that only the top portion 201 of the cutting tool 200 is horizontally symmetrical, thereby forming the recess 103. The recess 103 is, for example, a groove for forming the protrusion 21.

Then, the shape of the original 100 having the recesses 101, 102, and 103 is transferred to a resin material, thereby forming the optical sheet 14 having the protrusions 19, 20, and 21.

The single cutting tool 200 is attached to the original 100 and the original 100 is cut in different directions by different amounts, and hence the plurality of recesses 101, 102, and 103 having different shapes and different sizes are formed. The shape of the original 100 is then transferred to fabricate the optical sheet 14.

Accordingly, the optical sheet 14 can be easily and quickly manufactured, thereby decreasing manufacturing cost.

Figure 14:
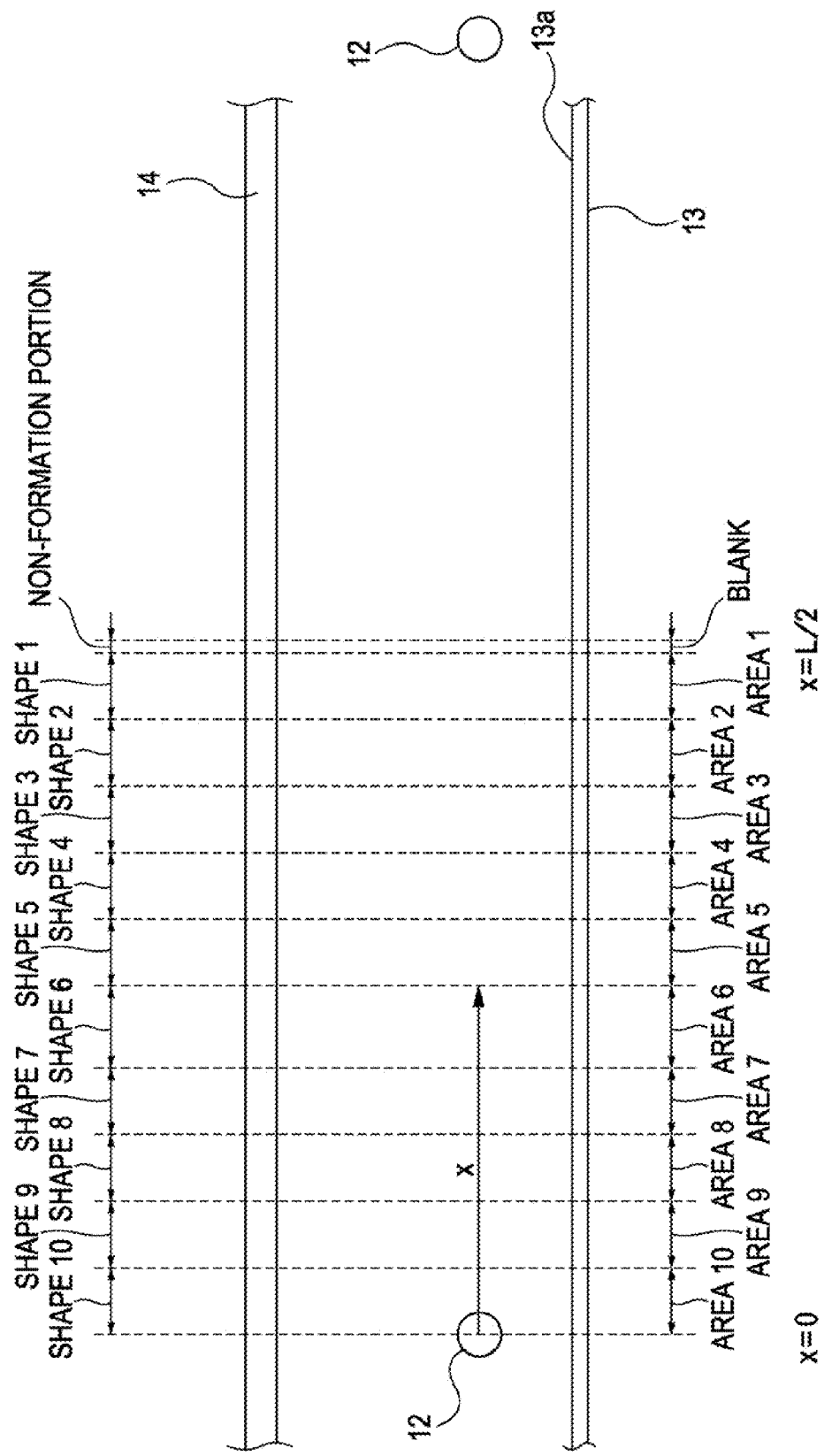
FIG. 14, together with FIGS. 15 and 16, illustrates an example of a specific configuration of an optical sheet, and is an illustration for divided areas and shapes of the areas.
Figure 15:
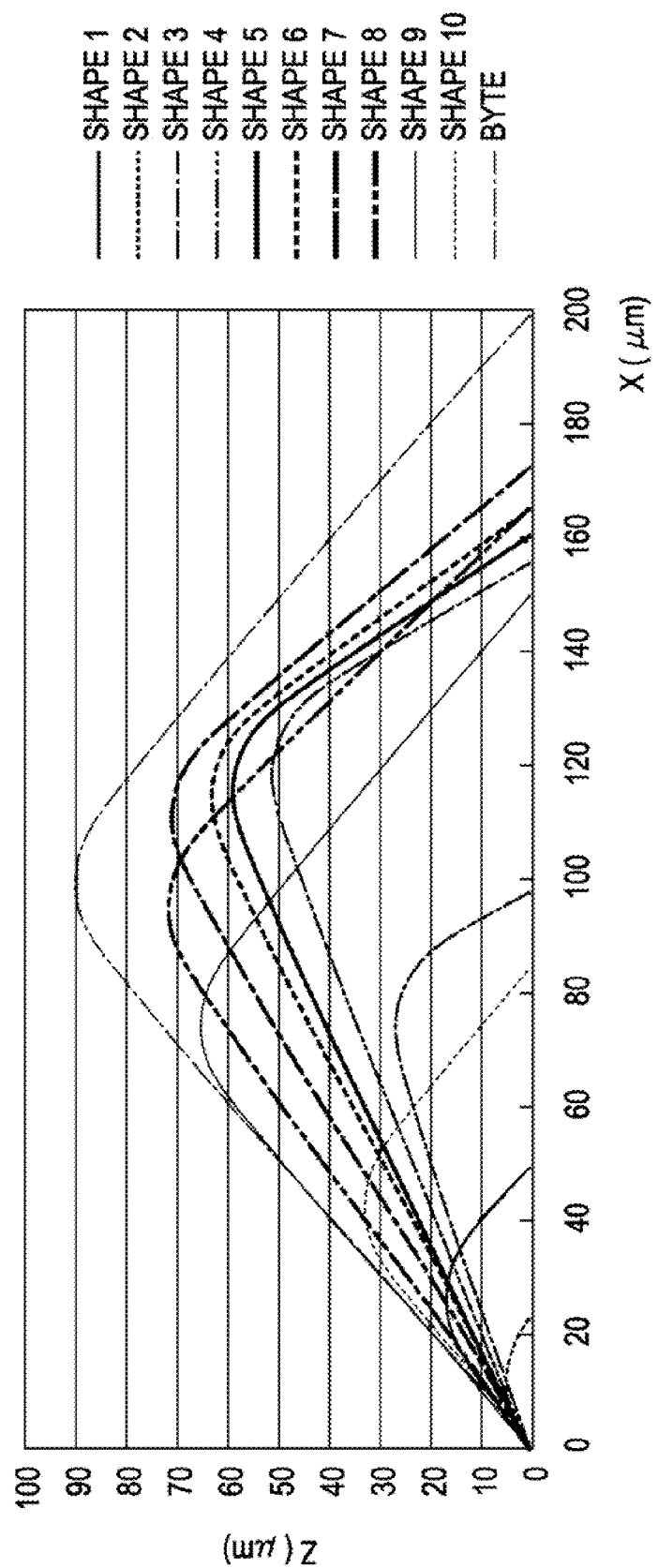
FIG. 15 is an illustration showing exemplary shapes and a cutting tool for forming the shapes.
Figure 16:
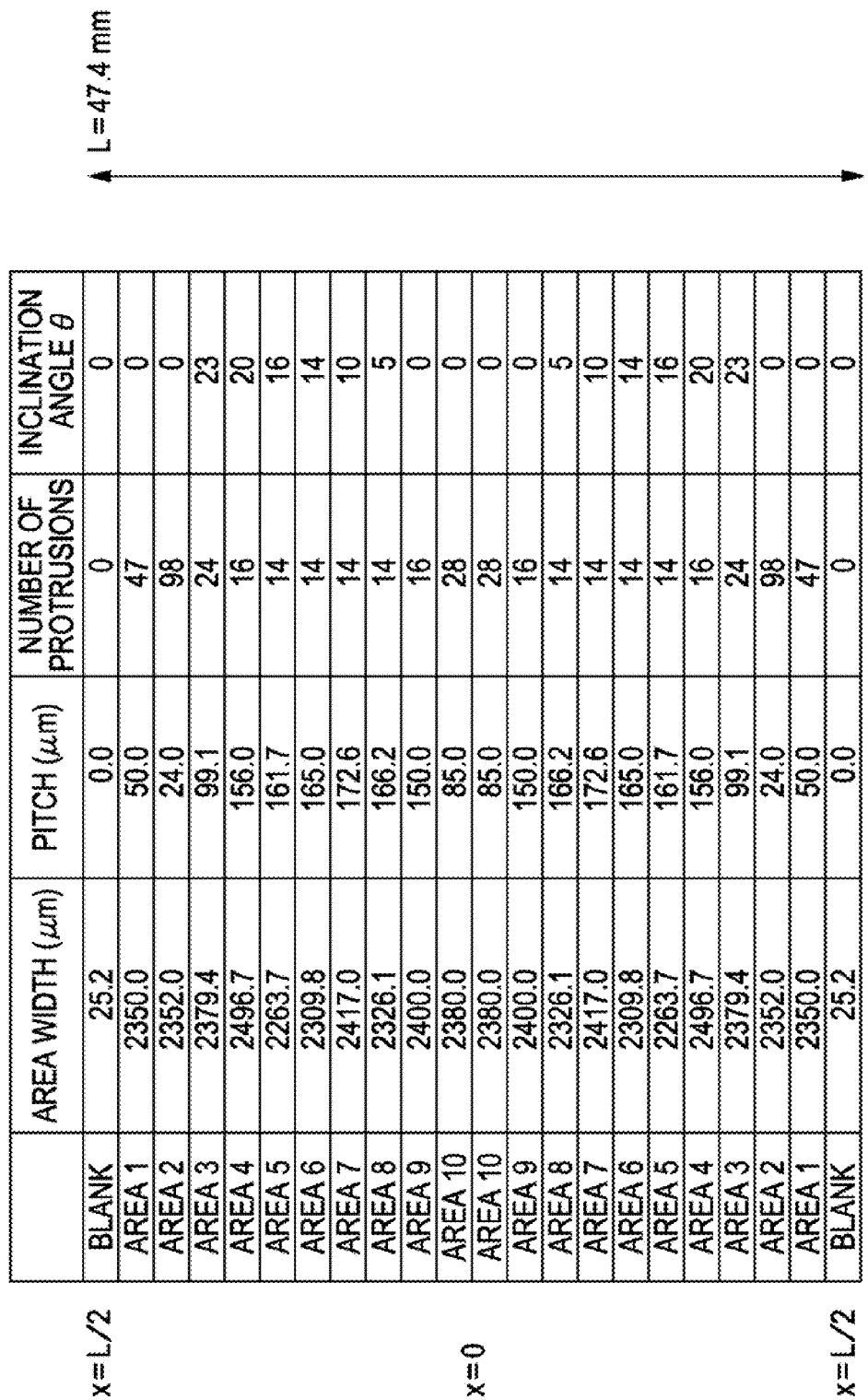
FIG. 16 is a table showing area widths etc. of respective areas.

Now, an example of a specific structure of the optical sheet 14 is described (see FIGS. 14 to 16).

The optical sheet 14 is divided into, for example, 10 areas (area 1 to area 10) within a range of from x=0 to x=L/2 (see FIG. 14). In the optical sheet 14, the 10 areas are horizontally symmetrically arranged within the range of from x=0 to x=L/2, and hence, a configuration of a right part with reference to x=0 will be described below.

The area is divided into the areas 10, 9, . . . , and 1 in that order from the position of x=0. An area on the right side of the area 1 is a blank area. The blank area serves as the protrusion-free portion 14a.

Referring to FIGS. 14 and 15, in the respective areas, the protrusions 19, 20, and 21 having the different shapes (shapes 1 to 10) are provided next to one another at predetermined pitches.

FIG. 15 illustrates the shapes and sizes of the shapes 1 to 10, in which the horizontal axis plots a width in the X direction, and the vertical axis plots a height in the Z direction. The term "cutting tool" in FIG. 15 is the cutting tool 200 for forming the shapes 1 to 10.

For example, the shapes 10 and 9, serving as the not-inclined protrusions 19, are provided in the areas 10 and 9 at a predetermined pitch. The shapes 8 to 3, serving as the inclined protrusions 20, are provided in the areas 8 to 3 at a predetermined pitch. The shapes 2 and 1, serving as the protrusions 21 with the substantially semicircular cross sections, are provided in the areas 2 and 1 at a predetermined pitch.

FIG. 16 is a table showing an area width (X direction) of each area, a pitch of a shape (protrusion) formed in each area, the number of shapes (protrusions) formed in each area, and an inclination angle of a protrusion (protruding direction of protrusion) formed in each area with respect to a perpendicular line. An inter-light-source distance L is, for example, 47.4 mm. A distance W between the center of the linear light source 12 and the optical sheet 14 is, for example, 11 mm.

Figure 17:
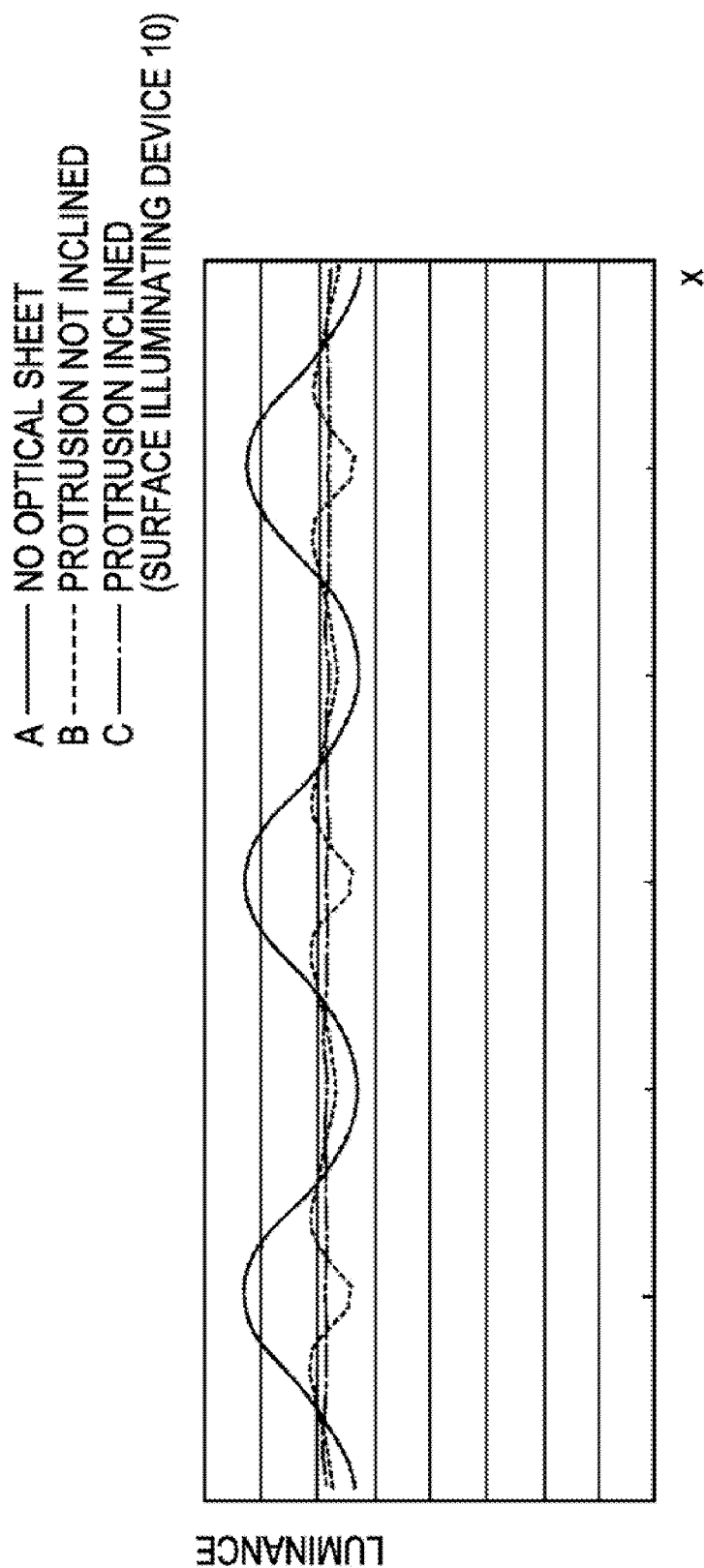
FIG. 17 is a graph showing data and a luminance distribution of a surface illuminating device of related art.

FIG. 17 is a graph in which luminance distributions provided by surface illuminating devices of three different structures A, B, and C are compared. Referring to FIG. 17, the surface illuminating device with the structure A includes a diffuser plate, and a prism sheet serving as a function sheet, but does not have an optical sheet. The surface illuminating devices with the structures B and C each include a diffuser plate, and a prism sheet and an optical sheet serving as function sheets.

The optical sheet of the surface illuminating device with the structure B has a luminance-distribution control layer with a plurality of protrusions which are not inclined. The surface illuminating device with the structure C includes the optical sheet 14 of the embodiment. The optical sheet 14 has the luminance-distribution control layer 18 with the protrusions 19, 20, and 21. In the surface illuminating device with the structure C (the surface illuminating device 10), an inter-light-source distance L is 47.4 mm, a distance W between the center of the linear light source 12 and the optical sheet 14 is 11 mm, and a distance between the center of the linear light source 12 and the reflector plate 13 is 3.5 mm.

Referring to FIG. 17, the surface illuminating device with the structure A causes unevenness in luminance by a large amount. Although the surface illuminating device with the structure B decreases unevenness in luminance, the surface illuminating device with the structure B causes unevenness in luminance with a high contrast every ½ period. The surface illuminating device with the structure C provides a substantially flat luminance distribution, thereby decreasing unevenness in luminance.

Next, an optical element covering member and an optical sheet assembly for unitizing the optical sheet 14 and the diffuser plate 15 are described (see FIGS. 18 to 21).

As described above, in the surface illuminating device 10, the optical sheet 14, the diffuser plate 15, the function sheets 16 are arranged in that order from a position near the linear light sources 12. The components may each have a low rigidity depending on their thicknesses, resulting in the components warping or waving. This may cause unevenness in luminance.

Figure 18:
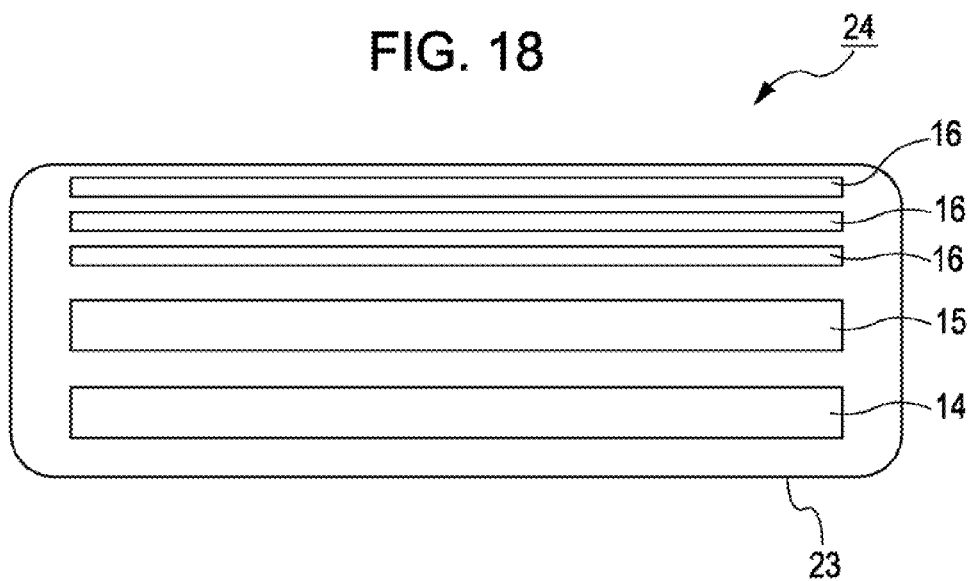
FIG. 18, together with FIGS. 19 and 20, illustrates an example of an optical element covering member, and is a conceptual diagram showing an example in which an optical sheet, a diffuser plate, and a function sheet are covered with a covering member.
Figure 19:
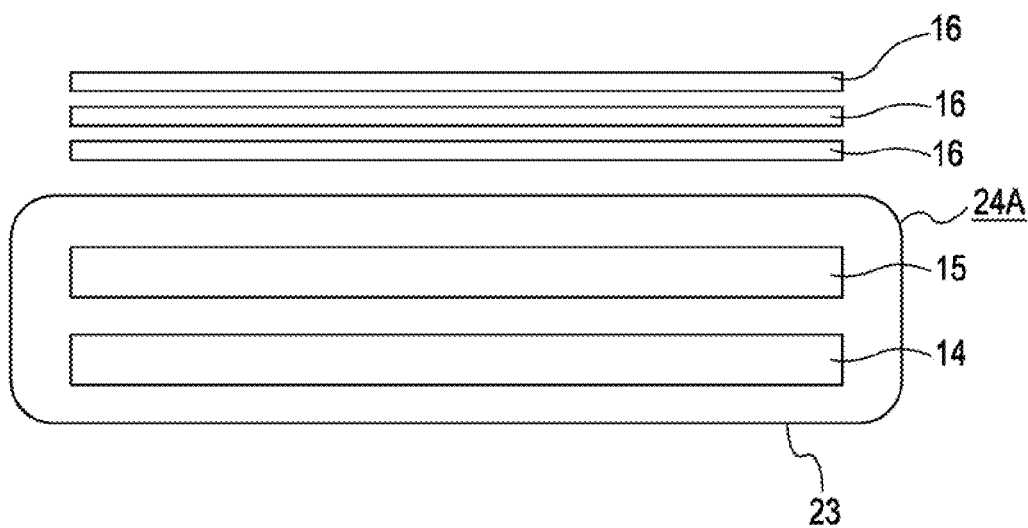
FIG. 19 is a conceptual diagram showing an example in which an optical sheet and a diffuser plate are covered with a covering member.
Figure 20:
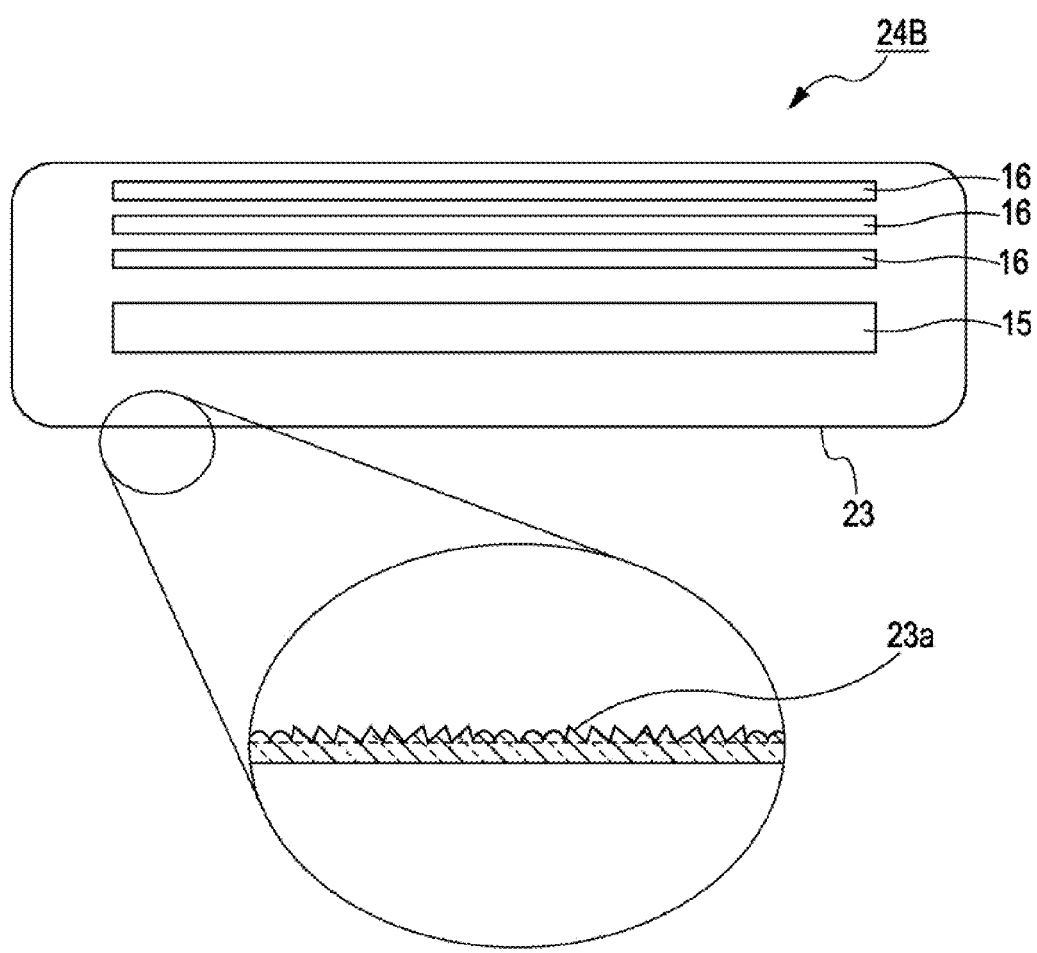
FIG. 20 is a conceptual diagram showing an example in which an optical sheet and a diffuser plate are covered with a covering member, and a luminance-distribution control layer is provided at a light incidence portion of the covering member.

To prevent warping and waving, optical element covering members 24, 24A, and 24B may be provided, in which the optical sheet 14 and the diffuser plate 15, or the optical sheet 14, the diffuser plate 15, and the function sheets 16, are covered with a covering member 23, such as a transparent sheet or a transparent film (see FIGS. 18 to 20).

The optical element covering member 24 shown in FIG. 18 covers the optical sheet 14, the diffuser plate 15, and the function sheets 16 with the covering member 23.

The optical element covering member 24A shown in FIG. 19 covers the optical sheet 14 and the diffuser plate 15 with the covering member 23.

The optical element covering member 24B shown in FIG. 20 covers the optical sheet 14, the diffuser plate 15, and the function sheets 16 with the covering member 23. Also, a luminance-distribution control layer 23a, having the same structure as the luminance-distribution control layer 18 of the optical sheet 14, is provided at a light incidence portion of the covering member 23.

By providing the luminance-distribution control layer 23a at the light incidence portion of the covering member 23, a dedicated optical sheet does not have to be provided. Hence, the cost can be decreased because of generalization of members.

If a filler or a binder is applied to the light incidence portion of the covering member 23, or if the light incidence portion contains a diffusing material, the covering member 23 can have diffusing property. Since the light incidence portion of the covering member 23 has the diffusing property, diffused light is incident on the optical sheet 14, and hence, unevenness in luminance can be further reliably decreased.

Likelihood of generation of the unevenness in luminance is increased when the position of the optical sheet 14 is shifted with respect to the linear light sources 12. However, by providing the portion with the diffusing property between the optical sheet 14 and the linear light sources 12, the influence of the positional shift can be suppressed, and the unevenness in luminance can be effectively decreased.

Further, since the diffuser plate 15 is a relatively thick optical member, the diffuser plate 15 can be used as a support for either of the optical element covering member 24, 24A, and 24B. By using the diffuser plate 15 as the support for either of the optical element covering member 24, 24A, and 24B, a dedicated support for preventing warping or the like does not have to be provided, thereby decreasing the number of components.

In addition, since the diffuser plate 15 functions as the support, the diffuser plate 15 can provide a certain rigidity. Hence, the thickness of the optical sheet 14 does not have to be increased to increase the rigidity, thereby decreasing the thickness of the surface illuminating device 10.

In addition, the covering member 23, such as a covering sheet or a covering film, may be formed of a material having elasticy or heat shrinkability, and the covering member 23 may closely contact a content in the covering member 23. Since the covering member 23 closely contacts the content, the optical sheet 14 and the function sheets 16 can be prevented from wrinkling even when the optical sheet 14 and the function sheets 16 expand or shrink by different amounts because of a change in temperature.

Figure 21:
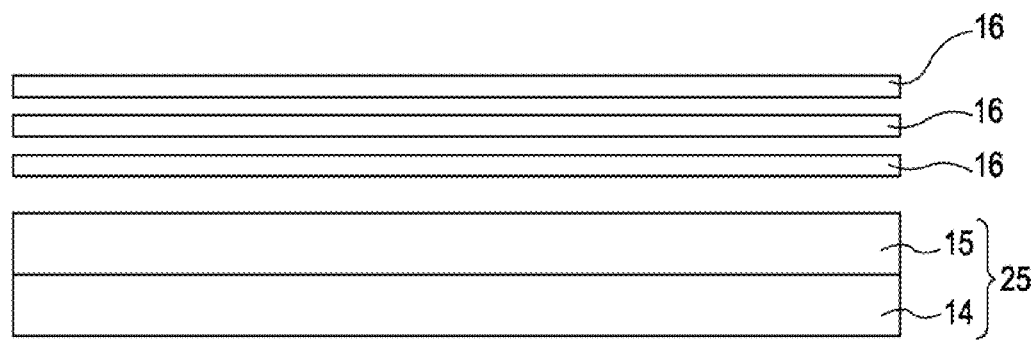
FIG. 21 is a conceptual diagram showing an optical sheet assembly formed by bonding an optical sheet to a diffuser plate.
Figure 22:
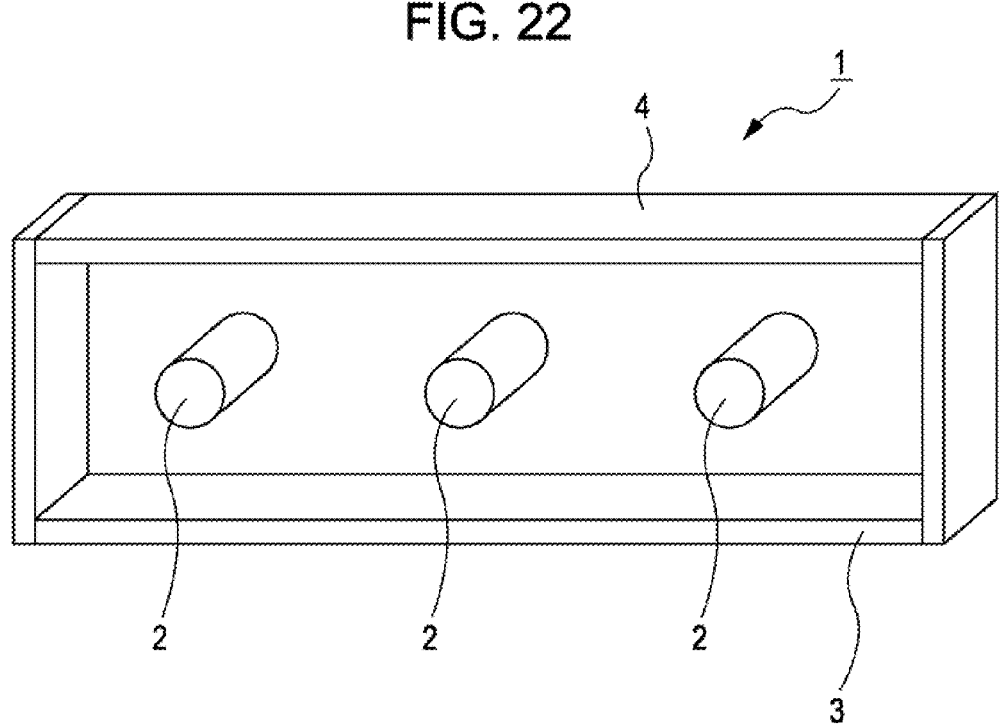
FIG. 22 is a schematic perspective view showing a surface illuminating device of related art.
Figure 23:
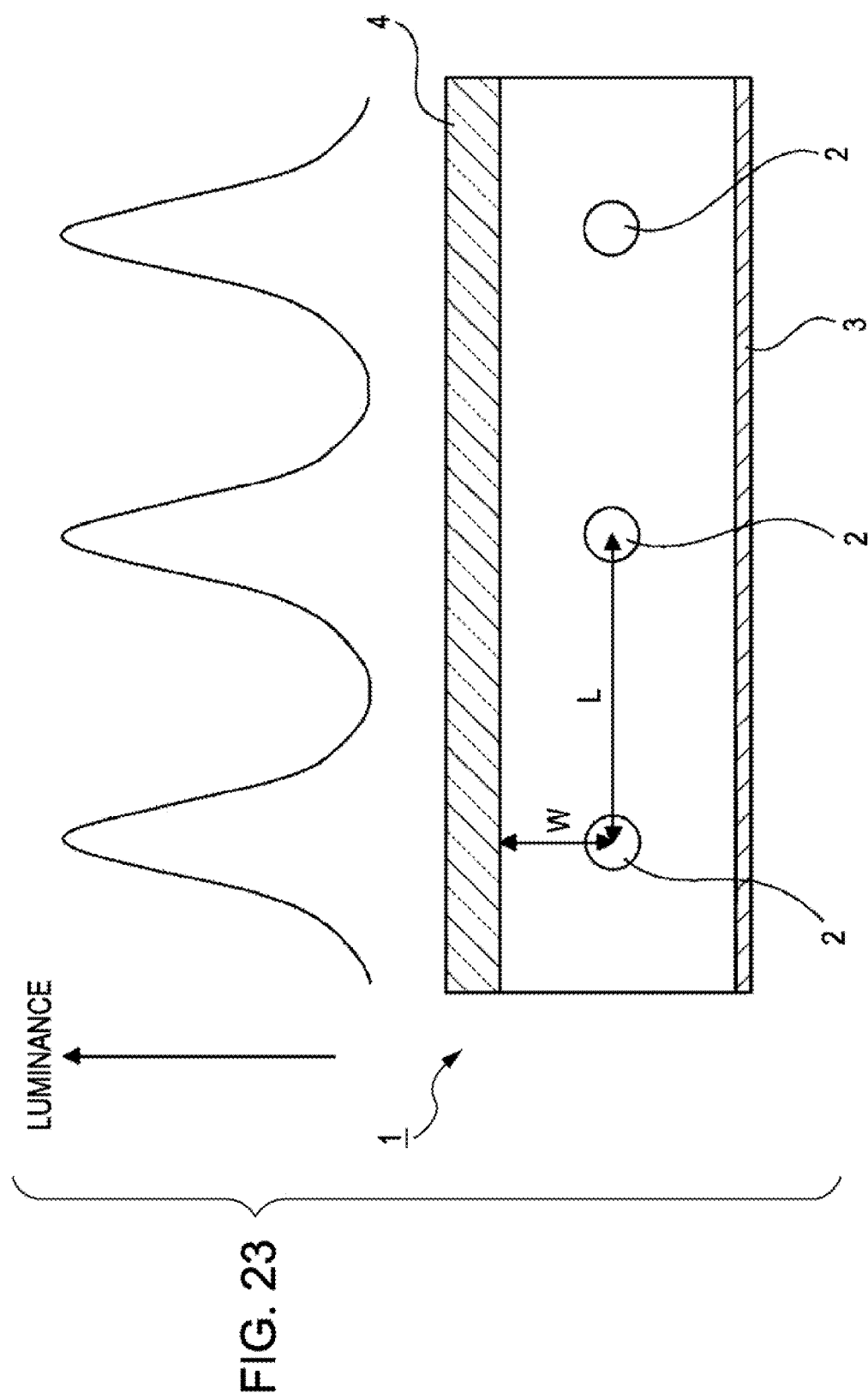
FIG. 23 is a conceptual diagram showing a luminance distribution of the surface illuminating device of related art.
Figure 24:
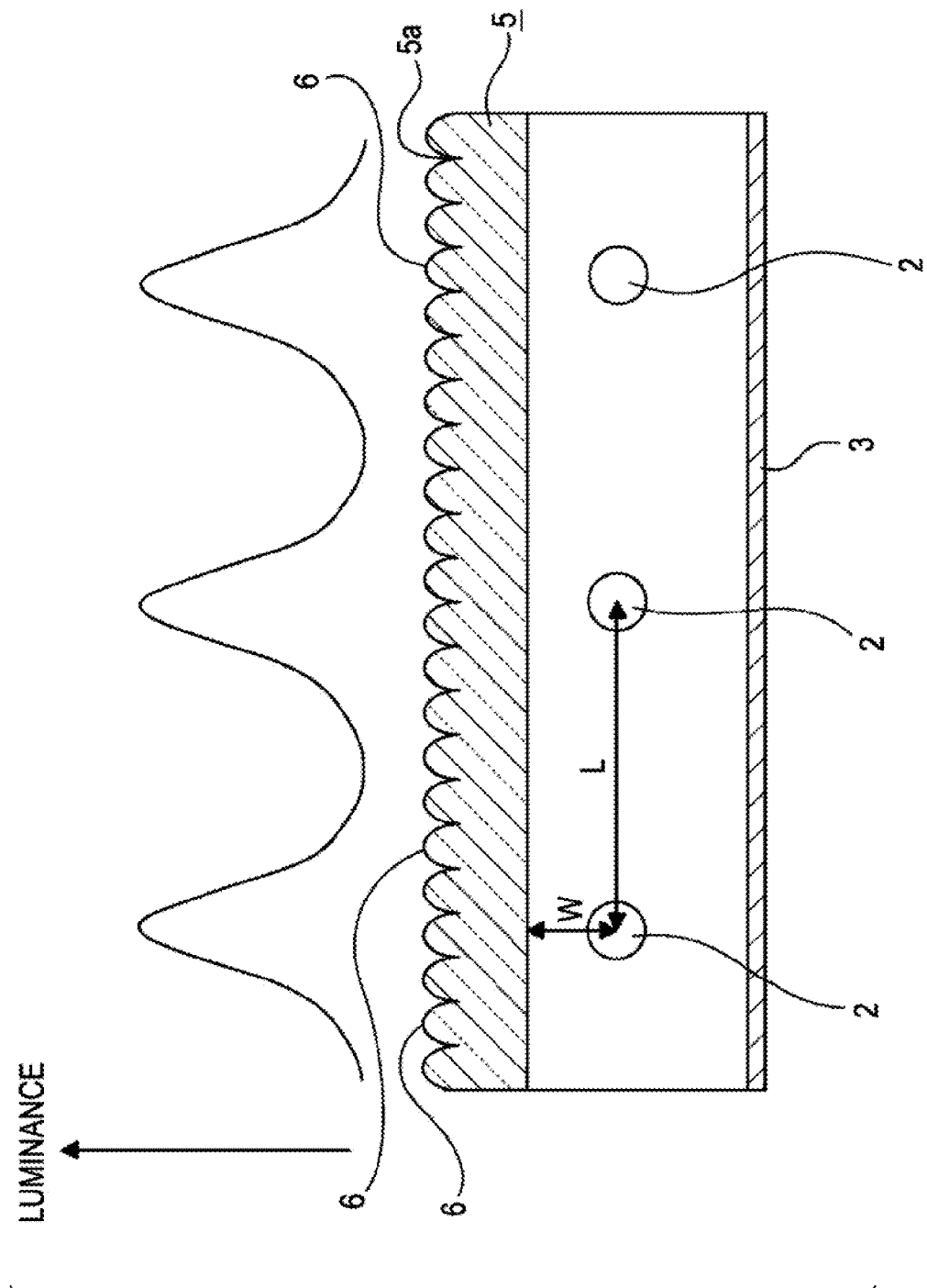
FIG. 24 is a conceptual diagram showing a luminance distribution when a luminance-distribution control layer is provided in a surface illuminating device of related art.
Figure 25:
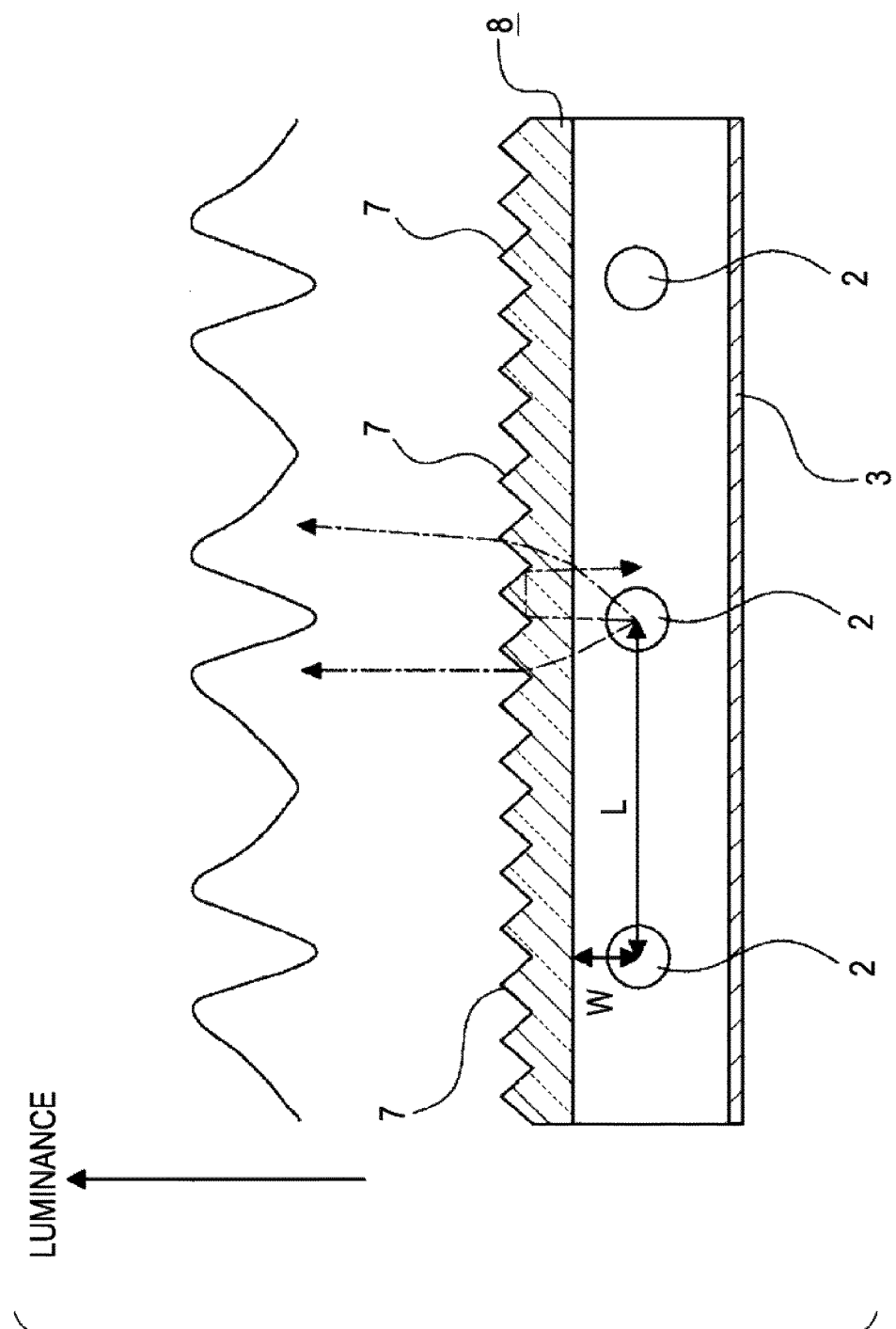
FIG. 25 is a conceptual diagram showing a luminance distribution when a distance between a linear light source and an optical sheet is decreased in a surface illuminating device of related art.

FIG. 21 illustrates an example of an optical sheet assembly 25 formed by bonding the optical sheet 14 and the diffuser plate 15 to each other by, for example, UV-curable resin or a pressure sensitive adhesive. In this case, the optical sheet assembly 25 may be formed by bonding the function sheets 16 to the diffuser plate 15, in addition to the optical sheet 14.

By providing either of the optical element covering member 24, 24A, and 24B, or the optical sheet assembly 25, the thickness can be increased, and hence the rigidity can be increased, thereby preventing warping and weaving from occurring.

The specific shapes and structures of the above-described components in the preferred embodiment are merely examples.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A surface illuminating device comprising:
 a plurality of linear light sources arranged in parallel to each other in a plane;
 a light-transmissive optical sheet including a luminance-distribution control layer formed on a light exit surface of the optical sheet, the luminance-distribution control layer decreasing unevenness in luminance of light emitted from the linear light sources; and
 a reflection surface positioned opposite to the optical sheet with the linear light sources interposed therebetween, the reflection surface reflecting the light emitted from the linear light sources,
 wherein the luminance-distribution control layer of the optical sheet includes a plurality of protrusions, the protrusions having ridgelines extending substantially in parallel to an extending direction of the linear light sources and being arranged continuously in an arrangement direction of the linear light sources, and
 wherein, in a range of $0 \leq x \leq L/2$, inclination angles of some or all the protrusions increase relative to a Z direction as the protrusions are located farther from the position of x=0 in the X direction,
 where an X direction represents the arrangement direction of the linear light sources, a Y direction represents the extending direction of the linear light sources, the Z direction represents a direction orthogonal to the X and Y directions, an inter-light-source distance L represents a distance between the centers of adjacent linear light sources from among the linear light sources, and x=0 at the centers of the linear light sources and increases to L/2 at the center positions between adjacent linear light sources.

2. The surface illuminating device according to claim 1, wherein an angle θ is determined as follows $$\theta 1 - 15° \leq \theta \leq \theta 1 + 5°$$

where θ1 is a refraction angle of the light emitted from the linear light source and being incident on the optical sheet, and θ is an inclination angle of each protrusion with respect to the Z direction.

3. The surface illuminating device according to claim 1, wherein an angle θ is determined as follows $$\theta 1 - 10° \leq \theta \leq \theta 5°$$

where θ1 is a refraction angle of the light emitted from the linear light source and being incident on the optical sheet, and θ is an inclination angle of each protrusion with respect to the Z direction.

4. The surface illuminating device according to claim 1, further comprising a diffusing member arranged opposite to the linear light sources with the optical sheet interposed therebetween, the diffusing member diffusing the light emitted from the linear light sources.

5. The surface illuminating device according to claim 1, wherein at least one of the inclined protrusions of the optical sheet have a substantially triangular cross section along an XZ plane.

6. The surface illuminating device according to claim 5, wherein at least one of the inclined protrusions have a top portion whose outer peripheral surface is a curved surface protruding in the protruding direction of the protrusion.

7. The surface illuminating device according to claim 1, wherein the optical sheet contains a diffusing material which diffuses the light emitted from the linear light sources.

8. The surface illuminating device according to claim 1, wherein the inter-light-source distance L is 30 mm or larger.

9. The surface illuminating device according to claim 1, wherein inclination angles of some protrusions increase relative to the Z direction located within a range of $L/10 \leq x \leq L/3$ from among the protrusions as the protrusions are located farther from the position of x=0 in the X direction.

10. The surface illuminating device according to claim 1, wherein some protrusions located within a range of $L/3 < x \leq L2$ from among the protrusions each have a substantially semicircular cross section along an XZ plane.

11. The surface illuminating device according to claim 4, comprising an optical sheet assembly in which the optical sheet is bonded with the diffusing member.

12. The surface illuminating device according to claim 4, comprising an optical element covering member in which the optical sheet and the diffusing member are covered with a covering member.

13. The surface illuminating device according to claim 12, wherein the covering member has diffusing property at a light incidence portion of the covering member.

14. The surface illuminating device according to claim 12, wherein the covering member includes the luminance-distribution control layer at the light incidence portion of the covering member, and
wherein the light incidence portion of the covering member serves as the optical sheet.

15. The surface illuminating device according to claim 12, wherein the diffusing member serves as a support for the optical element covering member.

16. The surface illuminating device according to claim 12, wherein the covering member is formed of a material having an elasticity property or a heat shrinkability property.

17. An image display apparatus comprising:
a display panel configured to display an image in accordance with an image signal; and
a surface illuminating device configured to illuminate the display panel from a back surface of the display panel, wherein the surface illuminating device includes
a plurality of linear light sources arranged in parallel to each other in a plane,
a light-transmissive optical sheet including a luminance-distribution control layer formed on a light exit surface of the optical sheet, the luminance-distribution control layer decreasing unevenness in luminance of light emitted from the linear light sources, and
a reflection surface positioned opposite to the optical sheet with the linear light sources interposed therebetween, the reflection surface reflecting the light emitted from the linear light sources,
wherein the luminance-distribution control layer of the optical sheet includes a plurality of protrusions, the protrusions having ridgelines extending substantially in parallel to an extending direction of the linear light sources and being arranged continuously in an arrangement direction of the linear light sources, and
wherein, in a range of $0 \leq x \leq L/2$, inclination angles of some or all the protrusions increase relative to a Z direction as the protrusions are located farther from the position of x=0 in the X direction,
where the X direction represents the arrangement direction of the linear light sources, a Y direction represents the extending direction of the linear light sources, the Z direction represents a direction orthogonal to the X and Y directions, an inter-light-source distance L represents a distance between the centers of adjacent linear light sources from among the linear light sources, and x=0 at the centers of the linear light sources and increases to L/2 at the center positions between adjacent linear light sources.

18. The surface illuminating device according to claim 1, wherein the amount of light reflected back by inner surfaces of the protrusions decreases in the X direction from x=0 to x=L/2.

19. The image display apparatus according to claim 17, wherein the amount of light reflected back by inner surfaces of the protrusions decreases in the X direction from x=0 to x=L/2.

* * * * *